US011080830B2

(12) United States Patent
Kask et al.

(10) Patent No.: US 11,080,830 B2
(45) Date of Patent: Aug. 3, 2021

(54) SYSTEMS AND METHODS FOR SEGMENTATION AND ANALYSIS OF 3D IMAGES

(71) Applicant: PerkinElmer Cellular Technologies Germany GmbH, Tallinn (EE)

(72) Inventors: Peet Kask, Harjumaa (EE); Kaupo Palo, Harjumaa (EE); Hartwig Preckel, Hamburg (DE)

(73) Assignee: PerkinElmer Cellular Technologies Germany GmbH, Tallinn (EE)

( * ) Notice: Subject to any disclaimer, the term of this patent is extended or adjusted under 35 U.S.C. 154(b) by 166 days.

(21) Appl. No.: 16/391,605

(22) Filed: Apr. 23, 2019

(65) Prior Publication Data

US 2019/0333197 A1    Oct. 31, 2019

Related U.S. Application Data

(60) Provisional application No. 62/662,487, filed on Apr. 25, 2018.

(51) Int. Cl.
*G06K 9/46* (2006.01)
*G06T 7/40* (2017.01)
(Continued)

(52) U.S. Cl.
CPC .............. *G06T 5/20* (2013.01); *G06T 3/40* (2013.01); *G06T 5/003* (2013.01); *G06T 5/40* (2013.01);
(Continued)

(58) Field of Classification Search
CPC ........... G06T 5/20; G06T 5/002; G06T 5/003; G06T 2207/20024–2207/20032; G06T 2207/20182; G06T 7/70–7/77; G06T 7/10–7/194; G06T 2207/20112–2207/20168; G06T 7/40–7/49; G06T 2200/04; G06K 9/00536–9/00563; G06K 9/6267–9/6287; G06K 9/00523; G06K 9/46–9/527
See application file for complete search history.

(56) References Cited

U.S. PATENT DOCUMENTS

2004/0151356 A1\* 8/2004 Li .................... G06T 7/0012
382/131
2016/0189373 A1   6/2016 Park et al.

OTHER PUBLICATIONS

Aug. 30, 2019—(WO) International Search Report and Written Opinion—App PCT/EP2019/060470.
(Continued)

*Primary Examiner* — Brian Werner
(74) *Attorney, Agent, or Firm* — Banner & Witcoff, Ltd.

(57) ABSTRACT

Described herein are computationally efficient systems and methods for processing and analyzing two-dimensional (2D) and three-dimensional (3D) images using texture filters that are based on the Hessian eigenvalues (e.g., eigenvalues of a square matrix of second-order partial derivatives) of each pixel or voxel. The original image may be a single image or a set of multiple images. In certain embodiments, the filtered images are used to calculate texture feature values for objects such as cells identified in the image. Once objects are identified, the filtered images can be used to classify the objects, for image segmentation, and/or to quantify the objects (e.g., via regression).

27 Claims, 18 Drawing Sheets
(3 of 18 Drawing Sheet(s) Filed in Color)

(51) Int. Cl.
*G06T 5/20* (2006.01)
*G06T 5/00* (2006.01)
*G06T 5/50* (2006.01)
*G06T 3/40* (2006.01)
*G06T 5/40* (2006.01)

(52) U.S. Cl.
CPC ...... *G06T 5/50* (2013.01); *G06T 2207/20036* (2013.01)

(56) References Cited

OTHER PUBLICATIONS

Sato et al, "Tissue Classification Based on 3D Local Intensity Structures for Volume Rendering" IEEE Transactions on Visualization and Computer Graphics, IEEE Service Center, Los Alamitos, CA, US, vol. 6, No. 2, Apr. 1, 2000, pp. 160-180, XP090936914, ISSN: 1077-2626, DOI: 10.1109/2945.856997.

Li Qiang et al, "Selective enhancement filters for nodules, vessels, and airway walls in two and three-dimensional CT scans" Medical Physics, AIP, Mellville, NY, US, vol. 30, No. 8, Aug. 1, 2003, pp. 2040-2051, XP012012183, ISSN: 0094-2405, DOI: 10.1118/1.1581411.

Jul. 2, 2019—(WO) Partial Search Report and Provisional Opinion—App PCT/EP2019/060470.

\* cited by examiner

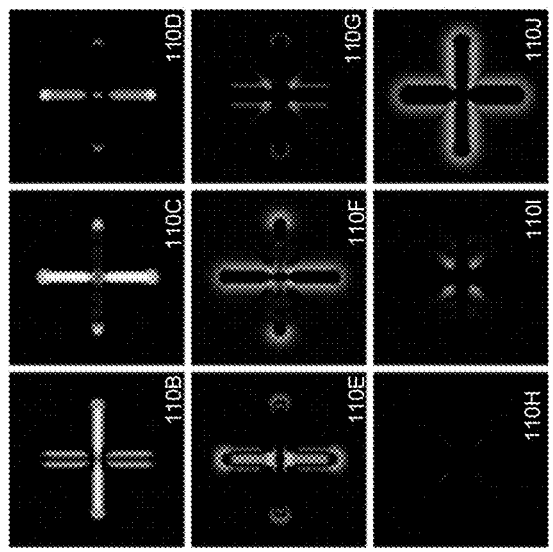
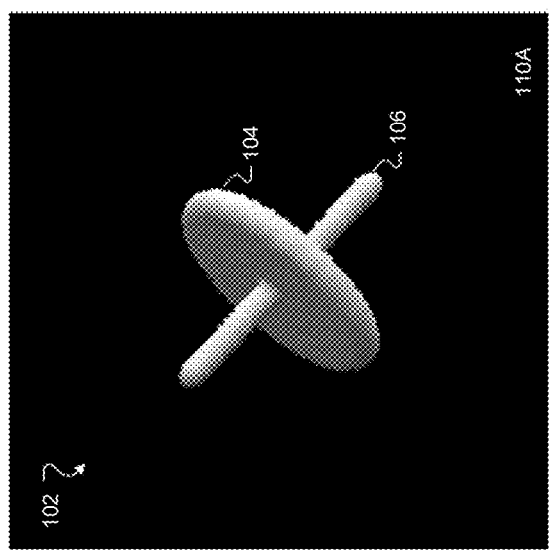
FIG. 1

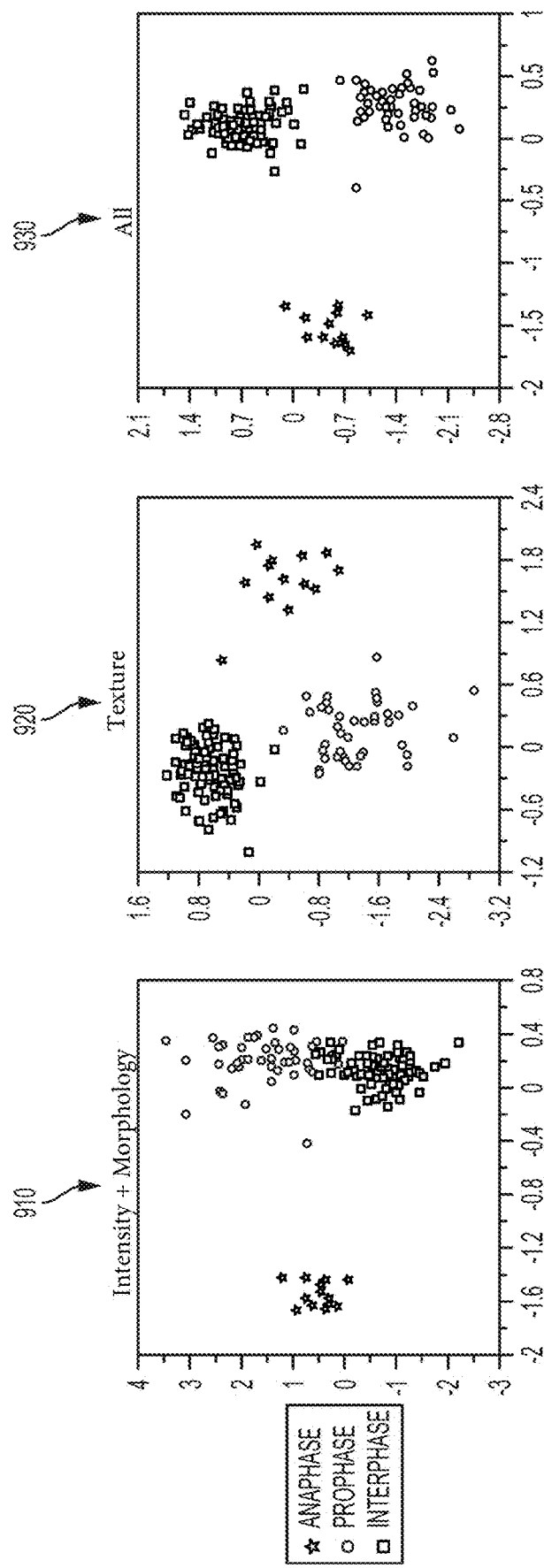

SYSTEMS AND METHODS FOR SEGMENTATION AND ANALYSIS OF 3D IMAGES

RELATED APPLICATION

This application claims priority to U.S. Provisional Patent Application No. 62/662,487 filed on Apr. 25, 2018, whose contents are expressly incorporated herein by reference in its entirety.

TECHNICAL FIELD

One or more aspects of the present disclosure relate generally to methods and systems of image analysis. More particularly, in certain embodiments, one or more aspects of the present disclosure relate to texture filters that improve image segmentation and/or object classification for the analysis of 3D images.

BACKGROUND

Cellular imaging can be performed by a large community of investigators in various fields, e.g., oncology, infectious disease, and drug discovery. There may be a wide array of technologies that are used to image living or fixed cellular samples including phase contrast microscopy, fluorescence microscopy, and total internal reflection fluorescence (TIRF) microscopy. "Cellular sample" or "sample" may include, for example, a biological specimen that is imaged, e.g., using cellular imaging. Examples of "cellular samples" or "samples" may include, e.g., individual cells, subcellular compartments, organelles, cell colonies, groups of cells, tissues, organoids, and small animals.

Advances in optical microscope technology have led to the ability to obtain very high content images of cellular specimens. For example, automated digital microscopes can be configured to automatically record images of multiple samples and/or specimens over extended periods of time with minimal user interaction. Imaging can be performed over time to study responses of cells to a drug, events in the cell cycle, or the like. These images can be traditional two-dimensional (2D) images of the cellular sample. Cells can also be imaged in three dimensions using various optical 3D imaging tools such as confocal fluorescence microscopes and light sheet fluorescence microscopes. For example, 3D images can be obtained as "image stacks," or a series of 2D images, each corresponding to an x-y plane in the z (height) dimension. Each x, y, z coordinate in an image stack corresponds to a "voxel", the 3D equivalent of a pixel in a 2D image. Each voxel corresponds to each of an array of the discrete elements of a 3D image.

Images (e.g., 2D and 3D images) can be obtained in multiple "channels." In fluorescence microscopy, each channel may correspond to the wavelength of a particular fluorescent probe that is targeted to a particular molecule (or molecules) and/or biological structure (or structures) of interest. Each channel may be associated with a particular probe by using an appropriate optical filter that limits the light recorded in a particular channel to a particular wavelength or range of wavelengths that is of interest.

Cellular images can provide increased insight into intracellular phenomena. For example, the actin in a cell can be stained with phalloidin that is conjugated to a fluorescent molecule such as tetramethylrhodamine (TRITC) to observe the rearrangement of microfilaments in the cell during cell division. While new imaging tools have allowed high content imaging (e.g., the rapid acquisition of large numbers of 3D, time-lapsed, and/or multichannel images), the techniques used to analyze these images have lagged behind such that much of the information in these images cannot be extracted and analyzed efficiently.

Image analysis software can facilitate the processing, analysis, and visualization of cellular images. Image analysis software may include various tools, including volume rendering tools (e.g., for volumetric compositing, depth shading, gradient shading, maximum intensity projection, summed voxel projection, and signal projection); manipulation functions (e.g., to define areas of structures of interest, delete unwanted objects, edit images and object maps); and measurement functions (e.g., for calculation of number of surface voxels, number of exposed faces, planar area of a region, and estimated surface area of a region, for use in automated tissue classification).

Cellular imaging can be used to perform biological tests including various pharmacological, chemical, and genetic assays. For example, cellular imaging can be used to observe how cells respond to different chemical treatments (e.g., contact with a chemical compound, e.g., contact with a pharmacological agent); genetic treatments (e.g., a gene knockout); and biological treatments (e.g., contact with a virus). Cell responses can include a change in cell proliferation rate, a change in the rate of apoptosis, a change in the expression of a given gene, a change in the distribution of biochemical signaling molecules, and the like. Based on an observed biological response, active compounds (e.g., active pharmacological agents) can be identified, and the potency and side effects of such compounds can be evaluated. Relevant genes (e.g., genes related to various disease states or signaling pathways) can also be determined using cellular imaging. For example, the mode of action of various pharmacological agents and alterations to signaling pathways can be accessed using cellular imaging. Modern methods of cellular imaging allow many (e.g., up to millions) of different treatments to be tested in a short period of time (e.g., in parallel, e.g., simultaneously). Fast and robust automated image analysis tools are thus needed to effectively and efficiently process and analyze the large number of cellular images that are obtained through these studies.

Cellular images can include many different objects. An "object" can be a portion of an image associated with a feature or biological entity of interest in the image. For example, an object can be a portion of an image that corresponds to a region-of-interest in a given biological sample (e.g., a single cell, e.g., a group of cells) or a region of an image that is associated with a given biological test or assay (e.g., a portion of an image associated with a treatment with a pharmaceutical agent, an inhibitor, a virus, or the like, e.g., a cell in an image that is displaying a characteristic response to one of said treatments).

Since the population of cells or other objects in an image can be heterogeneous, a single image can include objects with different characteristics. For example, cells can have many different phenotypes. To perform subsequent cellular analysis using a cellular image, objects must typically be separated from (e.g., segmented from) based on their phenotype or other identifying characteristics. Image segmentation may be a process of separating a digital image into discrete parts, identifying boundaries, and/or determining the location of objects in an image. This may involve assigning a label to each pixel (or voxel) in an image that identifies to which "segment" or part (e.g., which cell, which cell type, which organelle, etc.) of the image that pixel is associated. Segmentation is useful in a variety of fields, including cell imaging, medical imaging, machine vision, facial recognition, and content-based image retrieval. Particularly, in the biological field, segmentation simplifies analysis by eliminating extraneous portions of an image that would otherwise confound the analysis. For example, by segmenting regions of an image corresponding to viable cells, and thereby eliminating from analysis those cells that may otherwise be erroneously counted as viable, the extent of mitotic activity may be more easily and accurately appraised in the viable population.

Images can be segmented based on their texture. Texture-based segmentation usually begins with an image filtering step. For example, texture filtering may be accomplished by convoluting the original image with one or more convolution kernels. A "convolution kernel" can be a small (e.g., 5×5 or smaller) convolution matrix or mask used to filter an image. For example, Law's texture energy approach (Laws, Proc. Image Understanding Workshop, November 1979, pp. 47-51) determines a measure of variation within a fixed-size window as applied to a 2D image. A set of nine 5×5 convolution kernels may be used in yielding nine filtered images. In each pixel, the texture energy may be represented by a vector of nine numerical values corresponding to characteristics of the image in the local neighborhood of the pixel. Each component of the vector for each pixel may have a given purpose in the context of image analysis. Components can be used to provide a center-weighted local average, to detect edges, to detect spots, or to detect ripples in an image. The filtered images can then be used to segment the original image into different regions. There is a need for improved texture filtering for more efficient and accurate image segmentation and for the segmentation of 3D images.

Image segmentation can be performed to segment objects, identify members belonging to a class of interest (e.g., mitotic cells), and separate members of this class from remaining objects (e.g., cells of other cell types). Following this separation, objects in the class of interest (e.g., the mitotic cells) can be subjected to further analysis that is specific to the class of interest. For example, properties of the mitotic cells can be determined without including non-mitotic cells in the analysis. Segmentation may often be performed before useful results can be obtained. A failure or deficiency in the segmentation process can compromise results obtained subsequently. Thus, improved methods may be needed for the segmentation of cellular images.

An object (e.g., a cell) can include different biological components of interest (e.g. organelles, e.g., cytoskeletal filaments, e.g., vesicles, e.g., receptors). Certain biological components can be visualized using, for example, optical tags (e.g., a fluorescent stain, e.g., a selective moiety conjugated to a fluorescent molecule). Biological components of interest can also include biochemical signaling molecules. Biological components may need to be segmented and/or identified in images before subsequent analysis can be performed (e.g. to characterize their shape or other spatial and/or temporal features). For example, information about the biological components of interest may often be determined before objects can be unambiguously classified and/or biological responses to treatments can be reliably assessed. Thus, improved approaches may be needed to identify and segment biological objects in images.

Acquisition and analysis of cellular images can be time consuming, and rapid analysis of the acquired images is key to the efficiency of the process. Ambiguous, inconclusive results may require follow-up imaging, and results should not vary depending on the individual performing the test. It is thus desirable to automate the process of classifying imaged regions into various categories (e.g., based on cell type, phase of the cell cycle, and the like). For example, it may be the goal of a particular study to identify unique characteristics of cells imaged by a fluorescence microscopy platform. It may be desired to identify specific portions of the image of the cells which include a significant amount of information about the composition and health of the cells, for which advanced image analysis is needed. In this way, subsequent analysis can be performed in regions of interest rather than in the entire image, thereby saving processing time and improving accuracy.

The ability to automatically classify objects into categories of interest has applications across a wide range of industries and scientific fields, including biology, social science, and finance. Due to the large number of features (e.g., numeric properties) that typically must be calculated and considered in such classification, this process can be difficult, error-prone, computationally intensive, and time-consuming.

As described above, modern imaging systems can produce large sets of complex images (e.g., 3D images including multiple channels of image data), and the processing of these images can be generally much more computationally intense than the processing of traditional images. There is a need for computationally efficient methods for processing these 3D images for purposes of sample classification, object classification, image rendering, and image analysis (e.g., via regression and/or segmentation).

SUMMARY

Described herein are computationally efficient systems and methods for processing and analyzing two-dimensional (2D) and three-dimensional (3D) images using texture filters that are based on the Hessian eigenvalues (e.g., eigenvalues of a square matrix of second-order partial derivatives) of each pixel or voxel. The original image may be a single image or a set of multiple images. In certain embodiments, the filtered images are used to calculate texture feature values for objects such as cells identified in the image. The filtered images and/or the calculated texture feature values can be used to classify objects in the image, for image segmentation, and/or to quantify the objects (e.g., via regression).

Applying a set of texture filters to an image returns a set of filtered images, each of which essentially highlights a certain graphical attribute of the original image. For example, in certain embodiments where the original image is a three dimensional (3D) image, the procedure involves applying a set of Gaussian second-derivative filters to create a 3×3 Hessian matrix for each voxel and computing three eigenvalues of this matrix for each voxel. The Hessian eigenvalues describe second-order derivatives of the intensity landscape around the given voxel in the directions of Hessian eigenvectors (also called principal axes or principal directions). The highest Hessian eigenvalue is the second-order derivative of the intensity landscape in the direction with the highest curvature, and the lowest Hessian eigenvalue is the second-order derivative in the direction with the lowest curvature. The three eigenvalues form a vector in an abstract space of eigenvalues. Based on the vector of eigenvalues, an angular factor is calculated for each voxel and each filter, as a function of the angle between the vector of eigenvalues and a characteristic direction associated with a given texture filter.

Each characteristic direction (defined in the abstract space of eigenvalues) highlights a particular graphical attribute and is associated with a corresponding ideal intensity map. For example, the characteristic direction (0, 0, −1) describes a bright plane, where one out of three principal second-order derivatives (e.g., Hessian eigenvalues) is negative and the two others are zero. The intensity of a filtered image is a product of the modulus (e.g., magnitude) of the vector of eigenvalues (e.g., a larger modulus corresponds to larger variations in the intensity of the filtered image) and the angular factor (e.g., a smaller angle between the vector of an eigenvalue and the characteristic direction results in a larger contribution to the intensity of a filtered image generated using a given filter).

Once filtered images are produced and objects have been identified in the image, texture features corresponding to the identified objects can be calculated. The extracted features can be used to classify objects in the original image, in image segmentations, and/or in the determining qualities of interest for the objects (e.g., via regression). In certain embodiments, the texture filters described herein provide superior classification, regression, and segmentation performance over previous methods.

In one aspect, the present disclosure is directed to a method of three-dimensional image analysis. The method comprises receiving, by a processor of a computing device, a three-dimensional (3D) image comprising voxels [e.g., a three-dimensional image of a sample obtained by an imaging system (e.g., an optical microscope, e.g., a 3D optical microscope)]; applying, by the processor, a set of (e.g., six) second-derivative filters (e.g. Gaussian second-derivative filters) to the 3D image, thereby producing a corresponding set of second-derivative images; applying, by the processor, a set of (e.g., nine) rotationally invariant 3D texture filters to the set of second-derivative images using a set of predefined characteristic directions in Hessian eigenvalue space, thereby producing a corresponding set of (e.g., nine) filtered images; identifying, by the processor, using the set of filtered images and/or the 3D image, a plurality of objects (e.g., cells, e.g., portions of cells, e.g., mitotic spindles) in the 3D image (e.g., using automatic object recognition, e.g. using a method of local thresholding); and performing, by the processor, at least one of steps (a), (b), and (c) as follows using the set of filtered images: (a) classifying a portion (up to and including all) of the plurality of identified objects in the 3D image; (b) segmenting the 3D image to separate a portion (up to and including all) of the plurality of identified objects from the 3D image; and (c) determining a quality of interest value [e.g., a numerical value corresponding to a kind, type, and/or extent of a biological response to a given treatment (e.g., exposure to a pharmacological agent, a virus, or a signal pathway inhibitor), e.g., a numerical value corresponding to a probability that a cell is in a given phase of the cell cycle (e.g., mitosis)] for a portion (up to and including all) of the plurality of identified objects in the 3D image.

In certain embodiments, the method comprises performing, by the processor, step (a), and classifying the portion (up to and including all) of the plurality of identified objects in the 3D image comprises: determining, using the set of filtered images, texture feature values for a portion (up to and including all) of the plurality of identified objects (e.g., wherein each texture feature value is associated with an average intensity of a corresponding object of the plurality of identified objects); and calculating one or more classification scores from the texture feature values and using the classification score(s) to classify (e.g., group) each object of the portion of objects [e.g., wherein each classification score comprises a numerical value associated with a predetermined class (e.g., a group or pair of classes of objects)].

In certain embodiments, the method comprises performing, by the processor, step (b), and segmenting the 3D image to separate the portion (up to and including all) of the plurality of identified objects from the 3D image comprises: applying an intensity threshold to the portion of the plurality of identified objects and generating a binary image based on the applied threshold.

In certain embodiments, the method comprises performing, by the processor, step (c), wherein determining the quality of interest value for the portion (up to and including all) of the plurality of identified objects in the 3D image comprises: determining, using the set of filtered images, texture feature values for a portion (up to and including all) of the plurality of identified objects (e.g., wherein each texture feature value is associated with an average intensity of a filtered image in a location of a corresponding object of the plurality of identified objects); and determining the quality of interest value from a regression model evaluated using the texture feature values, wherein the regression model comprises regression parameters based on texture feature values of control objects (e.g., numerical values corresponding to cells with a known kind, type, and/or extent of a response, e.g., cells in a known phase of the cell cycle).

In certain embodiments the method comprises classifying a portion (up to and including all) of the 3D image and/or a sample (e.g., a biological sample, e.g., a cellular sample) associated with the 3D image by: determining texture feature values for a portion (up to and including all) of the set of filtered images (e.g., wherein each texture feature value is associated with an average intensity of a corresponding filtered image of the set of filtered images); and calculating one or more classification scores from the texture feature values and using the classification score(s) to classify (e.g., group) the portion of the 3D image and/or the sample associated with the 3D image [e.g., wherein each classification score comprises a numerical value associated with a predetermined class (e.g., group) of images and/or samples].

In certain embodiments the method comprises determining a quality of interest (e.g., an extent of a biological response to a pharmacological treatment) of a sample associated with the 3D image by: determining texture feature values for a portion (up to and including all) of the filtered images (e.g., wherein each texture feature value is associated with an average intensity of a corresponding filtered image); and determining the quality of interest value from a regression model evaluated using the texture feature values, wherein the regression model comprises regression parameters based on texture feature values of control images (e.g., images of samples with known levels of a biological response to a treatment, e.g., images of cells in a known phase of the cell cycle).

In certain embodiments, applying the set of rotationally invariant 3D texture filters to the set of second-derivative images comprises: computing, from the set of second-derivative images (e.g. from six second-derivative images), three eigenvalue images [e.g., a first image comprising a highest eigenvalue (H), a second image comprising a middle eigenvalue (M), and a third image comprising a lowest eigenvalue (L), at each voxel in the respective eigenvalue image]; computing, from the set of three eigenvalue images, a modulus of the vector of eigenvalues for each voxel and, for each predefined characteristic direction (of the set of predefined characteristic directions), an angular factor (e.g., using Equation 1, e.g., using Equation 2), thereby producing a set of (e.g. nine) angular factors for each voxel; and generating the set of filtered images using the modulus and the set of (e.g. nine) angular factors for each voxel.

In certain embodiments, each filter of the set of rotationally invariant 3D texture filters is associated with a corresponding predefined characteristic direction from the set of predefined characteristic directions.

In certain embodiments, the set of predefined characteristic directions comprises one or more members selected from the group consisting of: (i) characteristic direction (0,0,−1) corresponding to a Bright Plane filter, (ii) characteristic direction (0,−1,−1)/sqrt(2) corresponding to a Bright Line filter, (iii) characteristic direction (−1,−1,−1)/sqrt(3) corresponding to a Bright Spot filter, (iv) characteristic direction (1,−1,−1)/sqrt(3) corresponding to a Bright Saddle filter, (v) characteristic direction (1,0,−1)/sqrt(2) corresponding to a Saddle Filter, (vi) characteristic direction (1,1,−1)/sqrt(3) corresponding to a Dark Saddle filter, (vii) characteristic direction (1,1,1)/sqrt(3) corresponding to a Dark Spot filter, (viii) characteristic direction (1,1,0)/sqrt(2) corresponding to a Dark Line filter, and (ix) characteristic direction (1,0,0) corresponding to a Dark Plane filter.

In certain embodiments, computing an angular factor, for each voxel and for each predefined characteristic direction of the set of predefined characteristic directions, comprises determining an angle between a direction of the vector comprising the three Hessian eigenvalues of the voxel and the predefined characteristic direction (e.g., using Equation 1, e.g., using Equation 2).

In certain embodiments, the set of second-derivative filters comprises one or more members selected from the group consisting of a finite-impulse-response (FIR) approximation to a Gaussian derivative filter and a recursive infinite-impulse-response (IIR) approximation to a Gaussian derivative filter.

In certain embodiments, each of the texture feature values comprises a numerical value associated with a corresponding object.

In certain embodiments, each of the texture feature values comprises a numerical value corresponding to an average intensity of a portion (up to and including all) of a corresponding filtered image.

In certain embodiments, the method comprises calculating, for each voxel of each filtered image of the set of filtered images, one or more angles between a direction of an axis (e.g., a z axis) associated with the 3D image and a direction of one or more Hessian eigenvectors corresponding to the three Hessian eigenvalues (e.g., a direction of a Hessian eigenvector for the highest Hessian eigenvalue (H), a direction of a Hessian eigenvector for the lowest Hessian eigenvalue (L), or both) (e.g., calculating a cosine-square of the angle); and generating, from at least one of the filtered images of the set of filtered images, a first image and a second image, using the calculated angle(s), wherein the first image includes a horizontal component of the filtered image (e.g., generated from the sine-square of the angle multiplied by the filtered image) and the second image includes a vertical component of the filtered image (e.g., generated from the cosine-square of the angle multiplied by the filtered image).

In certain embodiments, the method comprises following receiving the 3D image, applying one or more deconvolution filters, by the processor, to the 3D image to correct for anisotropy in optical resolution (e.g., to correct for differences in image resolution in the x, y, and/or z directions, e.g., to correct for anisotropy characterized by an aspect ratio of a point spread function).

In certain embodiments, the method comprises following applying the set of (e.g., six) second-derivative filters to the 3D image, scaling second derivatives in each second-derivative image of the set of second-derivative images in one or more directions (e.g., in an x, y, and/or z direction), using one or more coefficients to correct for anisotropy in image and/or optical resolution (e.g., to correct for differences in image resolution in the x, y, and/or z directions, e.g., to correct for anisotropy characterized by an aspect ratio of a point spread function).

In certain embodiments, the one or more coefficient used to correct for anisotropy are determined empirically by (i) maximizing a ratio of an intensity of a spot-filtered image (e.g., a Bright Spot filtered image, e.g., a Dark Spot filtered image) to an intensity of a line-filtered image (e.g., a Bright Line filtered image, e.g., a Dark Line filtered image) and/or (ii) maximizing a signal-to-noise ratio of classification scores associated with objects from two different classes.

In certain embodiments, the method comprises following receiving the 3D image, binning (e.g., combining adjacent voxels of, e.g., summing adjacent voxels of, e.g., averaging adjacent voxels of) the 3D image using one or more binning factors, wherein each of the one or more binning factors comprises a coefficient for each dimension (e.g., each x, y, z dimension) of the 3D image (e.g., thereby generating one or more binned images) (e.g., thereby decreasing a number of voxels in each image) (e.g., thereby reducing computation time).

In certain embodiments, the 3D image is a multi-channel image comprising two or more channels of image data [e.g., corresponding to different colors, e.g., corresponding to different imaging sensors, e.g., corresponding to different imaging paths e.g., associated with two or more corresponding optical filters (e.g., used to view different fluorescent markers)] [e.g., wherein the multi-channel image comprises at least one detection channel corresponding to objects of interest (e.g., cell nuclei) in an image].

In certain embodiments, the method comprises determining morphological feature values for a portion (up to and including all) of the plurality of objects; calculating one or more classification scores from the texture feature values and the morphological feature values; and using the classification score(s) to classify (e.g., group) each object of the portion of objects [e.g., wherein each classification score comprises a numerical value associated with a predetermined class (e.g., a group or pair of classes of objects)].

In certain embodiments, the method comprises performing, by the processor, step (a), wherein classifying the portion (up to and including all) of the plurality of identified objects in the 3D image is performed using a method of statistical analysis, pattern recognition, or machine learning (e.g., linear discriminant analysis).

In certain embodiments, the method comprises displaying, (e.g., on a display of the computing device) at least one image of the set of filtered images and/or a result of one or more of performed steps (a), (b) and/or (c).

In certain embodiments, the method comprises segmenting a portion (up to and including all) of the plurality of identified objects to identify discrete portions of the objects (e.g. corresponding to a subsection of a cell, e.g. a mitotic spindle).

In another aspect, the present disclosure is directed to a method of two-dimensional image analysis. The method comprises: receiving, by a processor of a computing device, a two-dimensional (2D) image comprising pixels [e.g., a two-dimensional image of a sample obtained by an imaging system (e.g., an optical microscope)]; applying, by the processor, a set of (e.g., three) second-derivative filters (e.g., Gaussian second-derivative filters) to the 2D image, thereby producing a corresponding set of second-derivative images; applying, by the processor, a set of (e.g., 5) rotationally invariant 2D texture filters to the set of second-derivative images using a set of predefined characteristic directions, thereby producing a corresponding set of filtered images; identifying, by the processor, using the set of filtered images and/or the 2D image, a plurality of objects (e.g., cells, e.g., portions of cells, e.g., mitotic spindles) in the 2D image (e.g., using automatic object recognition, e.g. using a method of local thresholding); and performing, by the processor, at least one of steps (a), (b), and (c) as follows using the set of filtered images: (a) classifying a portion (up to and including all) of the plurality of identified objects in the 2D image; (b) segmenting the 2D image to separate a portion (up to and including all) of the plurality of identified objects from the 2D image; and (c) determining a quality of interest value [e.g., a numerical value corresponding to a kind, type, and/or extent of a biological response to a given treatment (e.g., exposure to a pharmacological agent, a virus, or a signal pathway inhibitor), e.g., a numerical value corresponding to a probability that a cell is in a given phase of the cell cycle (e.g., mitosis)] for a portion (up to and including all) of the plurality of identified objects in the 2D image.

In certain embodiments, applying the set of rotationally invariant 2D texture filters to the set of second-derivative image comprises: computing, from the set of second-derivative images, two eigenvalue images [e.g., a first image comprising a highest eigenvalue (H) image and a second image comprising a lowest eigenvalue (L) image, at each pixel in the respective eigenvalue image]; computing, from the two eigenvalue images, a modulus for each pixel and, for each predefined characteristic direction (of the set of predefined characteristic directions), an angular factor, (e.g., using Equation 6, e.g., using Equation 7), thereby producing a set of (e.g., five) angular factors; and generating the set of filtered images using the modulus and the set of angular factors for each pixel.

In certain embodiments, the set of predefined characteristic directions comprises one or more members selected from the group consisting of: (i) characteristic direction (1,1)/sqrt(2) corresponding to a Dark Spot filter, (1,0) corresponding to a Dark Line filter, (1,−1)/sqrt(2) corresponding to a Saddle filter, (0,−1) corresponding to a Bright Line filter, and (−1,−1)/sqrt(2) corresponding to a Bright Spot filter.

In another aspect, the present disclosure is directed to a system for three-dimensional image analysis. The system comprises a processor of a computing device and a memory. The memory stores instructions that, when executed by the processor, cause the processor to: (i) receive a three-dimensional (3D) image comprising voxels [e.g., a three-dimensional image of a sample obtained by an imaging system (e.g., an optical microscope, e.g., a 3D optical microscope)]; (ii) apply a set of (e.g., six) second-derivative filters (e.g. Gaussian second-derivative filters) to the 3D image, thereby producing a corresponding set of second-derivative images; (iii) apply a set of (e.g., nine) rotationally invariant 3D texture filters to the set of second-derivative images using a set of predefined characteristic directions, thereby producing a corresponding set of filtered images; (iv) identify using the set of filtered images and/or the 3D image, a plurality of objects (e.g., cells, e.g., portions of cells, e.g., mitotic spindles) in the 3D image (e.g., using automatic object recognition, e.g. using a method of local thresholding); and (v) perform at least one of steps (a), (b), and (c) as follows using the set of filtered images: (a) classify a portion (up to and including all) of the plurality of identified objects in the 3D image; (b) segment the 3D image to separate a portion (up to and including all) of the plurality of identified objects from the 3D image; and (c) determine a quality of interest value [e.g., a numerical value corresponding to a kind, type, and/or extent of a biological response to a given treatment (e.g., exposure to a pharmacological agent, a virus, or a signal pathway inhibitor), e.g., a numerical value corresponding to a probability that a cell is in a given phase of the cell cycle (e.g., mitosis)] for a portion (up to and including all) of the plurality of identified objects in the 3D image.

In another aspect, the present disclosure is directed to a system for two-dimensional image analysis. The system comprises a processor of a computing device and a memory. The memory stores instructions that, when executed by the processor, cause the processor to: (i) receive a two-dimensional (2D) image comprising pixels [e.g., a two-dimensional image of a sample obtained by an imaging system (e.g., an optical microscope)]; (ii) apply a set of (e.g., three) second-derivative filters (e.g. Gaussian second-derivative filters) to the 2D image, thereby producing a corresponding set of second-derivative images; (iii) apply a set of (e.g., five) rotationally invariant 2D texture filters to the set of second-derivative images using a set of predefined characteristic directions, thereby producing a corresponding set of filtered images; (iv) identify using the set of filtered images and/or the 2D image, a plurality of objects (e.g., cells, e.g., portions of cells, e.g., mitotic spindles) in the 2D image (e.g., using automatic object recognition, e.g. using a method of local thresholding); and (v) perform at least one of steps (a), (b), and (c) as follows using the set of filtered images: (a) classify a portion (up to and including all) of the plurality of identified objects in the 2D image; (b) segment the 2D image to separate a portion (up to and including all) of the plurality of identified objects from the 2D image; and (c) determine a quality of interest value [e.g., a numerical value corresponding to a kind, type, and/or extent of a biological response to a given treatment (e.g., exposure to a pharmacological agent, a virus, or a signal pathway inhibitor), e.g., a numerical value corresponding to a probability that a cell is in a given phase of the cell cycle (e.g., mitosis)] for a portion (up to and including all) of the plurality of identified objects in the 2D image.

BRIEF DESCRIPTION OF THE DRAWING

The patent or application file contains at least one drawing executed in color. Copies of this patent or patent application publication with color drawing(s) will be provided by the Office upon request and payment of the necessary fee.

The foregoing and other objects, aspects, features, and advantages of the present disclosure will become more apparent and may be better understood by referring to the following description taken in conjunction with the accompanying drawings, in which:

FIG. 1 is a three-dimensional image of a simulated 3D object and corresponding results of applying nine rotationally invariant 3D filters, according to an embodiment of the present disclosure;

FIG. 9A is a plot of verification data used for classification in LDA feature space for interphase, prophase, and anaphase based on intensity and morphology features, according to an illustrative embodiment of the invention;

FIG. 9B is a plot of verification data used for classification in LDA feature space for interphase, prophase, and anaphase based on texture features, according to an illustrative embodiment of the invention;

FIG. 9C is a plot of verification data used for classification in LDA feature space for interphase, prophase, and anaphase based on intensity, morphology, and texture features, according to an illustrative embodiment of the invention;

Figure 2:
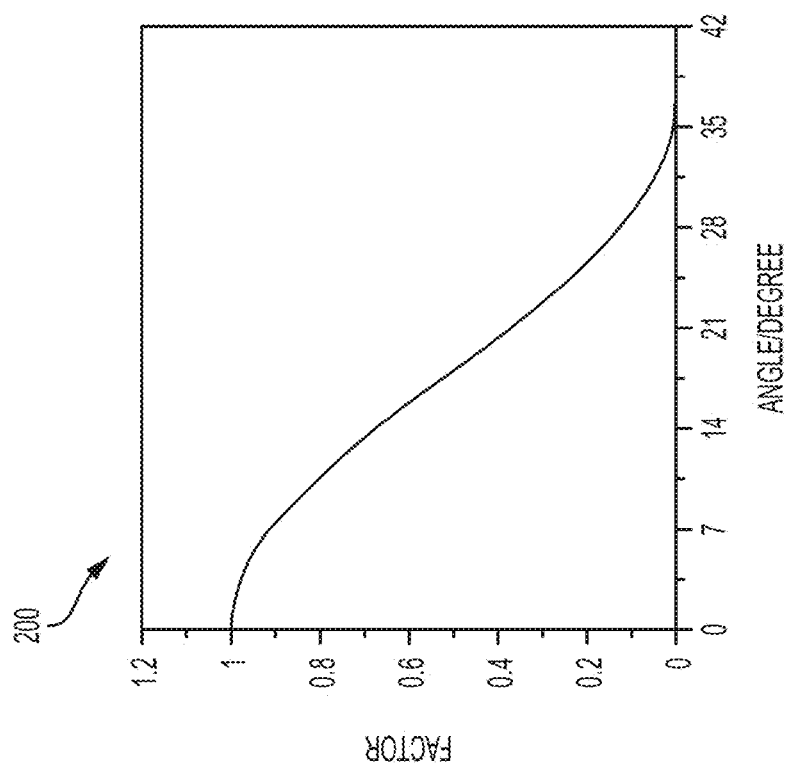
FIG. 2 is a plot of an angular factor as a function of the angle between the vector of eigenvalues (H, M, L) and a characteristic direction of a given filter in the space of eigenvalues, according to an embodiment of the present disclosure.

The features and advantages of the present disclosure will become more apparent from the detailed description set forth below when taken in conjunction with the drawings, in which like reference characters identify corresponding elements throughout. In the drawing, like reference numbers generally indicate identical, functionally similar, and/or structurally similar elements.

DETAILED DESCRIPTION

It is contemplated that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it is contemplated that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing certain action is immaterial so long as the invention remains operable. Moreover, two or more steps or actions may be conducted simultaneously.

Elements of embodiments described with respect to a given aspect of the invention may be used in various embodiments of another aspect of the invention. For example, it is contemplated that features of dependent claims depending from one independent claim can be used in apparatus, articles, systems, and/or methods of any of the other independent claims.

The mention herein of any publication, for example, in the Background section, is not an admission that the publication serves as prior art with respect to any of the claims presented herein. The Background section is presented for purposes of clarity and is not meant as a description of prior art with respect to any claim.

The following description makes use of a Cartesian coordinate system in describing positions, orientations, directions of travel of various elements of and relating to the systems and methods described herein. However, it should be understood that specific coordinates (e.g., "x, y, z") and related conventions based on them (e.g., a "positive x-direction", an "x, y, or z-axis", an "xy, xz, or yz-plane", and the like) are presented for convenience and clarity, and that, as understood by one of skill in the art, other coordinate systems could be used (e.g., cylindrical, spherical) and are considered to be within the scope of the claims.

An "image," e.g., as used in a 3D image of a cellular sample, may include any visual representation, such as a photograph, a video frame, streaming video, as well as any electronic, digital or mathematical analogue of a photo, video frame, or streaming video. Any apparatus described herein, in certain embodiments, includes a display for displaying an image or any other result produced by the processor. Any method described herein, in certain embodiments, includes a step of displaying an image or any other result produced via the method. As used herein, "3D" or "three-dimensional" with reference to an "image" means conveying information about three dimensions (e.g., three spatial dimensions, e.g., the x, y, and z dimensions). A 3D image may be rendered as a dataset in three dimensions and/or may be displayed as a set of two-dimensional representations, or as a three-dimensional representation.

A "class," e.g., as used in a class of objects, may refer to a set or category of objects having a property, attribute, and/or characteristic in common. A class of objects can be differentiated from other classes based on the kind, type, and/or quality of a given property, attribute, and/or characteristic associated with the class. A set of objects can be classified to separate the set into one or more subsets or classes. For example, objects, corresponding to cells in an image, can be classified to separate the cells into classes based on their phase in the cell cycle. For example, one class of cells may be "Mitotic Cells," corresponding to the set of cells in an image that are identified as undergoing mitosis. Another class of cells may be "Apoptotic Cells," corresponding to cells in an image that are identified as undergoing apoptosis. A "mask" can be a graphical pattern that identifies a 2D or 3D region of an image and can be used to control the elimination or retention of portions of an image or other graphical pattern.

Texture features are characteristics of an image, or a portion thereof, corresponding to a particular object (or part thereof) that are represented by numerical texture feature values derived from intensity variations around each pixel (for 2D images) or voxel (for 3D images) of the image or portion. Generally, intensity relates to the relative brightness (e.g., power*area) of a voxel (or pixel). For example, a region of an image having bright voxels may have a high intensity, and a region of an image having dark voxels may have a low intensity. Measuring the relative change of intensity of a voxel (or pixel) in relation to neighboring voxels (or pixels) in one or more directions can indicate various information useful for classification, segmentation, and/or regression tasks. Classification and regression are discussed in more detail, for example, in U.S. Pat. No. 8,942,459, filed Sep. 12, 2011, which is incorporated herein by reference in its entirety. An exemplary method of segmentation is discussed in detail in U.S. Pat. No. 9,192,348, filed Jan. 23, 2014, which is incorporated herein by reference in its entirety.

The present disclosure provides a set of filters which facilitate detection of useful texture features for classification and regression tasks, as well as for segmentation tasks. Texture features that are indicative of the class to which the object (or portion thereof) belongs can be used for classification purposes—for example, to determine whether an imaged cell (or other portion of a biological sample) is healthy or not.

Texture features can also be used to quantify the extent (or grade) of a disease (e.g., via regression). For example, it is possible to use texture feature values to quantify how far a disease has developed (e.g., a level, grade, and/or extent of the disease). In certain embodiments, several features of an object are determined. For example, the method may identify a region of an image, then apply filters and calculate texture feature values for that region. A regression model (e.g., a linear or nonlinear model) comprising regression parameters built using training data (e.g., texture feature values of control samples, e.g., samples with known properties). This regression model is then evaluated for the test sample. How far a disease has developed is then quantified.

In certain embodiments, the image filters used in the disclosed methods can be rotationally invariant. That is, rotation of the original image does not influence the outcome of applying the filter, except that the result is also rotated. Embodiments described herein use rotationally invariant filters in three dimensions. A set of three-dimensional rotationally invariant filters is presented herein such that each filter is sensitive to a particular ideal intensity map. For example, a Bright Plane filter may return a maximum intensity in a voxel that is located on a plane of higher intensity than its neighborhood. In contrast, a Bright Line filter may return a maximum intensity in a voxel located on a line of a higher intensity than its neighborhood.

The set of 3D texture filters may return filtered images, each of which may highlight a certain graphical attribute of the 3D landscape (e.g., of the 3D image). For example, in certain embodiments, the procedure may involve applying a set of Gaussian second derivative filters and computing three Hessian eigenvalues for each voxel which describe second order derivatives in the directions of three eigenvectors (principal axes). Then, the vector defined by the three eigenvalues may be compared to a set of characteristic directions. Each characteristic direction describes a particular ideal landscape. For example, the characteristic direction (0, 0, −1) describes a bright plane, where one out of three principal second order derivatives (i.e., Hessian eigenvalues) is negative and two others are zero.

A filtered image may be obtained by computing an angular factor for each voxel based on the angle (in the space of eigenvalues) between the direction of the vector of the three eigenvalues (which may generally be different in each voxel) and the vector of the characteristic direction corresponding to the filter type. For example, the characteristic direction (0,0, −1) corresponds to a Bright Plane filter. A smaller angle between the direction of the vector computed for the voxel and the vector of the characteristic direction corresponds to a larger angular factor. The angular factor and the modulus (e.g., magnitude) of the vector of eigenvalues in each voxel are used to construct a set of filtered images. Once the set of filtered images is obtained, corresponding texture feature values may be determined. These feature values can then be used in the classification of objects represented in the original 3D image, in image segmentation, and/or in the quantitative analysis of the sample (e.g., via regression).

In certain embodiments, a 3D image is represented as voxel (e.g., volumetric pixel) data. Various cell imaging devices and other 3D imaging devices (e.g., a laser scanning confocal microscope, a spinning disk confocal microscope, a light sheet microscope, etc.) output 3D images comprising voxels or otherwise have their output converted to 3D images comprising voxels for analysis. In certain embodiments, a voxel corresponds to a unique coordinate in a 3D image (e.g., a 3D array). In certain embodiments, each voxel exists in either a filled or an unfilled state (e.g., binary ON or OFF). In other embodiments, a voxel is further associated with one or more colors, textures, time series-data, etc. In certain embodiments, each of the voxels in a 3D image is connected to one or more neighbors (or boundaries), corresponding to those voxels in the 3D image which are located adjacent to (e.g., are touching) a voxel. In certain embodiments, a voxel's neighbors are referred to as the voxel's neighborhood. In various embodiments, given a first voxel, the neighborhood of the first voxel includes: (1) voxels that are adjacent to the first voxel (e.g., those that touch the first voxel), (2) voxels which are adjacent to the neighbors of the first voxel (or, e.g., up to a threshold level of adjacency), (3) voxels which are adjacent to or immediately diagonal to the first voxel, (4) voxels which are within a threshold distance of the first voxel (e.g., a distance 'r' in inches, centimeters, voxels, etc.), and/or (5) any other convenient definition of neighbors. Each image may be a single image or a set of multiple images.

Texture Filters

Referring now to FIG. 1, a three-dimensional (3D) image and the results of nine rotationally invariant three-dimensional (3D) filters are shown, in accordance with an embodiment of the present disclosure. For exemplary purposes, image 110A shows a threshold mask corresponding to a simulated 3D image. The simulated object depicted in image 110A is a spinner 102 consisting of a nearly vertical rod 106 and a nearly horizontal disk 104. The image of the spinner 102 is composed of voxels. In certain embodiments, the 3D image is passed through (e.g., processed using) one or more rotationally invariant filters (e.g., nine filters, less than nine filters, or more than nine filters) designed to be sensitive to an ideal intensity map, thereby producing an image that is reflective of (e.g., that emphasizes) a particular geometric attribute of the four-dimensional intensity landscape (intensity considered the fourth dimension, in addition to three spatial dimensions). The results of passing the 3D image of the spinner 102 through nine filters—Bright Plane, Bright Line, Bright Spot, Bright Saddle, Saddle, Dark Saddle, Dark Spot, Dark Line, and Dark Plane filters—are shown as images 110B-110J, respectively. The Bright Plane filter returns maximum intensity in a voxel which is located on a plane of a higher intensity than its neighborhood, while a Bright Line filter returns maximum intensity in a voxel located on a line of a higher intensity than its neighborhood. As such, the rod 106 of the spinner 102 is best visible on the Bright Line filtered image 110B while the disk 104 of the spinner 102 is best visible on the Bright Plane filtered image 110C. Similarly, both the rod 106 and the disk 104 result in a halo on the Dark Plane filtered image 110J because the intensity map is concave in the outer regions of both the rod and the disk.

Table 1 shows feature values extracted for spinner 102 shown in FIG. 1. The texture feature values are presented for spinner 102 as a whole ("Spinner"), for rod 106 alone ("Rod"), and for disk 104 alone ("Disk"). In this illustrative example, each extracted feature value in a given region of the object (Spinner, Rod or Disk) is calculated as the average intensity of the corresponding filtered image in the corresponding region. In other embodiments, texture features are a summed intensity, a mean intensity, a standard deviation of intensity, or other statistical measures of intensity in a region of interest of an image associated with an object.

TABLE 1

Example texture features values for the spinner image shown in FIG. 1.

|  | Spinner | Rod | Disk |
|---|---|---|---|
| Bright Plane | 34.7 | 18.6 | 36.8 |
| Bright Line | 10.9 | 36.3 | 8.5 |
| Bright Spot | 2.8 | 11.9 | 1.9 |
| Bright Saddle | 2.0 | 12.0 | 0.9 |
| Saddle | 1.1 | 2.7 | 0.8 |
| Dark Saddle | 0.0 | 0.0 | 0.0 |
| Dark Spot | 0.0 | 0.0 | 0.0 |
| Dark Line | 0.0 | 0.0 | 0.0 |
| Dark Plane | 0.1 | 0.2 | 0.1 |

The following is a description of the design of an exemplary set of 3D texture filters used in various embodiments of the claimed invention. First, a full set of Gaussian second-derivative filters are applied using an input parameter corresponding to the scale of Gaussian filtering. As used herein, the term "scale" (e.g., of a Gaussian filter or of a Gaussian second-derivative filter) refers to the characteristic radius of the Gaussian convolution kernel used in the corresponding filter. Application of the full set of Gaussian second-derivative filters produces six second derivative values for each voxel, resulting in six second-derivative images denoted by $L_{xx}$, $L_{yy}$, $L_{zz}$, $L_{xy}$, $L_{xz}$, and $L_{yz}$.

In a second step, the 3×3 Hessian matrix is diagonalized for each voxel. The 3×3 Hessian matrix of second-order derivative filtered images is presented as Matrix 1, below:

$$\begin{matrix} L_{xx} & L_{xy} & L_{xz} \\ L_{xy} & L_{yy} & L_{yz} \\ L_{xz} & L_{yz} & L_{zz} \end{matrix}$$

The diagonalization of the 3×3 Hessian matrix (Matrix 1) is an eigenproblem. The solution to the eigenproblem includes calculating three eigenvalues which describe the second-order derivatives in the directions of three principal axes. The eigenvalues can be calculated by solving a cubic equation. In certain embodiments, the directions of principal axes in the physical space of the biological sample (e.g., in the xyz-coordinates of the sample under the microscope) are unimportant, and the calculation of eigenvectors can be skipped. The result of the diagonalization is the highest, middle, and lowest eigenvalues (H, M, L) for each voxel. In other words, in the diagonalization step, three images are calculated from the six images produced by application of the full set of Gaussian second-derivative filters.

In certain embodiments, a direction defined by the vector (H, M, L) and a set of characteristic directions of a 3×3 Hessian matrix are used for the calculation of texture filters. In certain embodiments, the vectors corresponding to characteristic directions are (0,0,−1), (0,−1,−1)/sqrt(2), (−1,−1,−1)/sqrt(3), (1,−1,−1)/sqrt(3), (1,0,−1)/sqrt(2), (1,1,−1)/sqrt(3), (1,1,1) sqrt(3), (1,1,0)/sqrt(2) and (1,0,0), which correspond to the Bright Plane, Bright Line, Bright Spot, Bright Saddle, Saddle, Dark Saddle, Dark Spot, Dark Line, and Dark Plane filters, respectively. A negative value of a second derivative corresponds to a convex intensity map in a given direction. The characteristic directions may be considered ideal (e.g., in the sense that they may only rarely be obtained when real data are processed). In certain embodiments, an angle (e.g., or a value obtained by applying a trigonometric function to the angle, e.g., cosine-square of the angle) between each characteristic direction and the given real direction of (H, M, L) is calculated.

The smallest angle between two characteristic directions is $\alpha_0 = \arccos(2/\sqrt{6})$ (e.g., the angle between a diagonal of a cube and a diagonal of an edge of the cube). This angle is approximately $\pi/5$, or about 36 degrees. A filtered image (F) may then be expressed as a product of modulus (A) of the vector of eigenvalues and an angular factor ($\Phi$) calculated for each voxel based on (H, M, L) and the angle ($\alpha$) between the direction defined by vector (H, M, L) and the characteristic direction of the filter using $$F = \begin{cases} \sqrt{H^2 + M^2 + L^2} \, (1 + \cos(5\alpha))/2, & \text{if } \alpha < \pi/5 \\ 0 & \text{otherwise} \end{cases} \quad (1)$$

FIG. 2 shows an illustrative plot 200 of the angular factor ($\Phi$) as a function of angle $\alpha$. The angular factor is a smooth function of a decreasing from 1.0 at $\alpha=0$ to 0 at $\alpha=\pi/5$. The angular factor can also be calculated as a function of $\cos(\alpha)$ according to:

$$\Phi = \begin{cases} (1 + \cos^2(\alpha) - 10\cos^3(\alpha)\sin^2(\alpha) + 5\cos(\alpha)\sin^4(\alpha))/2 & \text{if } \cos(\alpha) < \cos(\pi/5) \\ 0 & \text{otherwise} \end{cases} \quad (2)$$

The value of F calculated for each voxel of the original image is used to generate a filtered image with the same dimensions, where each voxel in the filtered image corresponds to a voxel of the original image. In certain embodiments, a real set of eigenvalues (H, M, L) for each voxel of a 3D image has a non-zero contribution in up to four filtered images. For example, the direction of the vector defined by (H, M, L) for a particular voxel may only rarely be parallel to any of the characteristic directions. When the direction of (H, M, L) is between the characteristic directions, the angular factor may be non-zero for up to four of the closest directions. The remaining angular factors will be zero.

For a given voxel, the modulus A of Eq. 1 is common for all filters while the angular factor ($\Phi$) is different for different filters. A set of angular factors can be calculated for each voxel of a 3D image and used to generate a set of filtered images. The filtered image generated using a particular filter includes the angular factor for each voxel of the 3D image using Equation 1 or Equation 2 above, where a is the angle between the direction of vector (H, M, L) and the characteristic direction associated with the filter.

Figure 4:
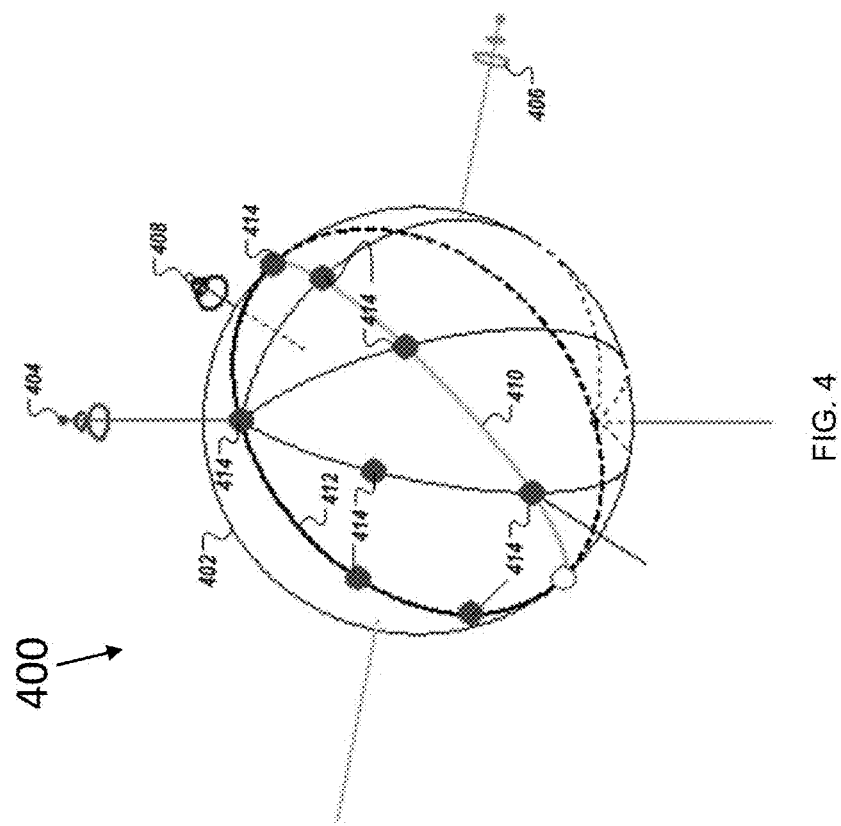
FIG. 4 is an illustration of nine characteristic directions in the space of eigenvalues corresponding to the design of nine filters, according to an embodiment of the present disclosure.

Illustrative examples of characteristic directions are presented in diagram 400 shown in FIG. 4. The unit sphere 402 shows the H (highest eigenvalue) axis 404, the M (second highest eigenvalue) axis 406, and L (lowest eigenvalue) axis 408. The meridian 410 corresponds to the condition H=M. As shown in FIG. 4, all direction vectors 414 are on the line or one side of the line, because H≥M by definition. Similarly, the bold line 412 corresponds to the condition M=L. Therefore, all direction vectors 414 are on the line or on one side of the line, because M≥L by definition.

Use of a 3D Rotationally Invariant Filtered Images

Figure 14A:
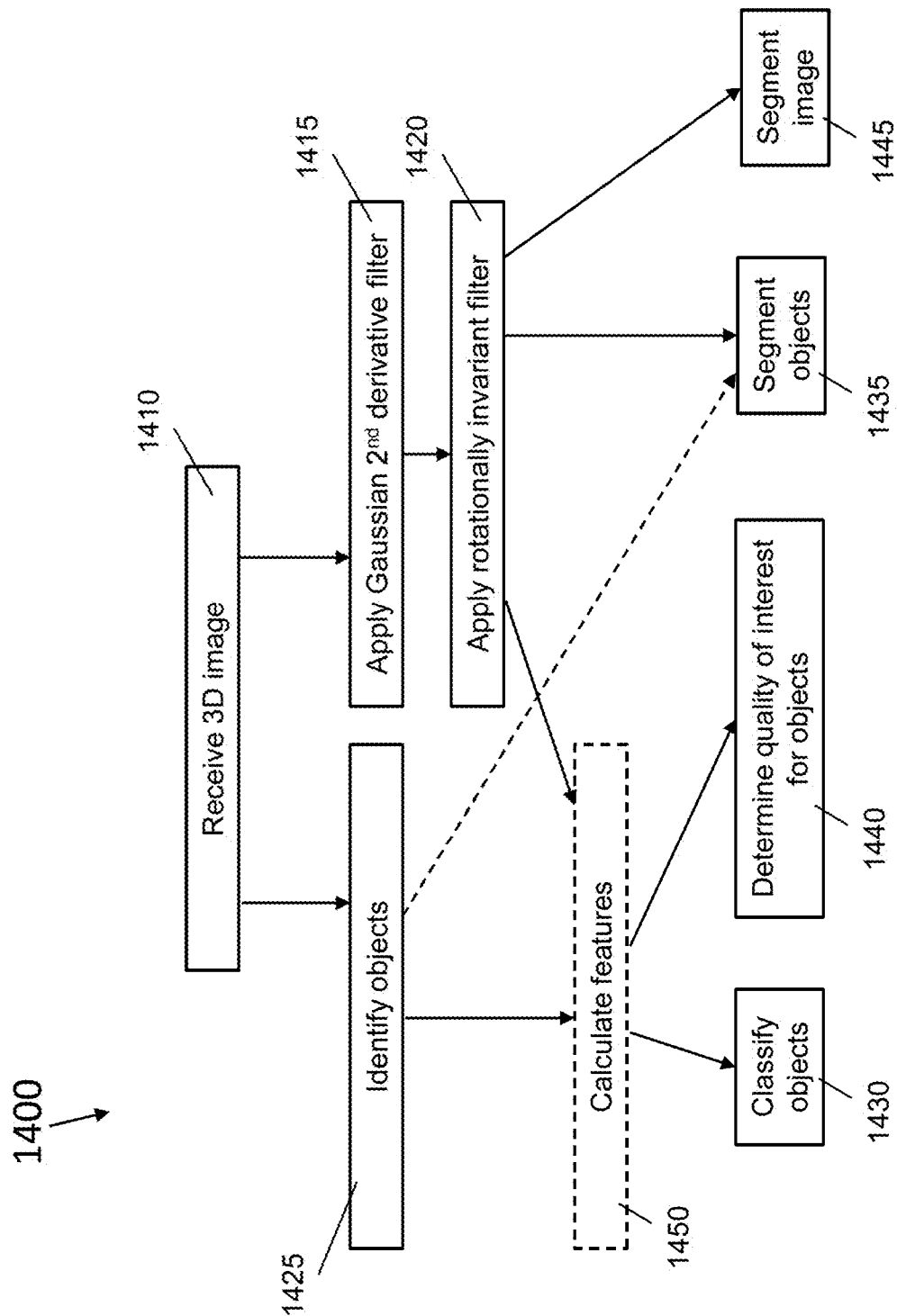
FIG. 14A is a block diagram of a method for 3D image analysis, according to an illustrative embodiment.

FIG. 14A shows an illustrative example of a method 1400 for performing 3D image analysis, according to an illustrative embodiment. Method 1400 begins with receiving, by the processor of a computing device, a three-dimensional (3D) image (step 1410). For example, the 3D image may be a 3D image of a sample obtained by a 3D imaging system (e.g., an optical microscope, e.g., a 3D optical microscope, e.g., a computed tomography (CT) or micro-CT imaging system). For example, the 3D image may be an image of a plurality of cells (e.g., cells cultured according to standard protocols for a given assay or biological test). The 3D image includes voxels. In certain embodiments, the 3D image is a multi-channel image that includes two or more channels of image data. The different channels of image data can correspond, for example, to different colors, to different imaging sensors used to acquire an image, to different imaging paths (e.g., different imaging paths in an optical microscope), and/or to different optical filters (e.g., used to view different fluorescent markers).

In certain embodiments, one or more deconvolution filters are applied to the 3D image to correct for anisotropy in image and/or optical resolution. For example, deconvolution filters can help to correct for differences in image resolution in the x, y, and/or z directions. This anisotropy is typically quantified by an aspect ratio of a point spread function of the imaging system. In certain embodiments, additional steps are taken to correct for anisotropy in image resolution, as described below.

In certain embodiments, the received image is binned (e.g., adjacent voxels of the image are combined, summed, or averaged) to increase the speed of computations. The image can be binned using binning factor(s), where each binning factor may include a coefficient for each dimension (e.g., each x, y, z dimension) of the 3D image. A coefficient for a given dimension determines, for example, how the image is binned in that dimension. For example, a binning coefficient of "2" in the x dimension may indicate that intensity values for each pair of voxels in the x direction are averaged, and the average value is assigned to a new voxel that takes the place of the original pair of voxels. The resulting "binned image" may have fewer voxels than the original 3D image, (e.g., a binning coefficient of "2" in the x direction results in half as many voxels in the x dimension). This decrease in the number of voxels in the image may allow subsequent steps to be performed more quickly (e.g., with a reduced computation time).

After the 3D image is received by the processor, objects (e.g., cells, e.g., portions of cells) can be identified in the 3D image (step 1425). For example, objects can be identified using a method of automatic object recognition such as local thresholding. During thresholding, for example, regions of an image with an average intensity either above or below a predefined threshold value may be identified as objects. For example, one channel of a multi-channel 3D image may be used to view a nuclear stain, and the images from this channel may be used to identify cell nuclei (e.g., by applying a local threshold based on the relative brightness of the nuclei versus surrounding cellular space). During thresholding, for example, regions of an image with an average intensity either above or below a predefined threshold value may be identified as objects. In certain embodiments, objects may be identified using the filtered images from step 1420.

After the 3D image is received, a set of (e.g., six) second-derivative filters (e.g. Gaussian second-derivative filters) may be applied to the 3D image in step 1415 to produce a corresponding set of second-derivative images. For example, the set of second-derivative filters can include a finite-impulse-response (FIR) approximation to a Gaussian derivative filter or a recursive infinite-impulse-response (IIR) approximation to a Gaussian derivative filter (e.g., applied via a method of R. Deriche, "Recursively implementating the Gaussian and its derivatives", RR-1893, INRIA (1993) or L. J. van Vliet et al., "Recursive Gaussian Derivative Filters," Proceedings of the 14th International Conference on Pattern Recognition, ICPR'98, Brisbane (Australia), 16-20 Aug. 1998, IEEE Computer Society Press, Vol. I, pp. 509-514 (1998), both of which are incorporated herein by reference in their entirety).

In step 1420, a set of (e.g., nine) rotationally invariant 3D texture filters can be applied to the set of second-derivative images (produced in step 1415) using a set of predefined characteristic directions to produce a corresponding set of (e.g., nine) filtered images. In certain embodiments, each filter of the set of rotationally invariant 3D texture filters can be associated with a corresponding predefined characteristic direction (e.g., as described with respect to FIG. 4).

Figures 15A, 15B:
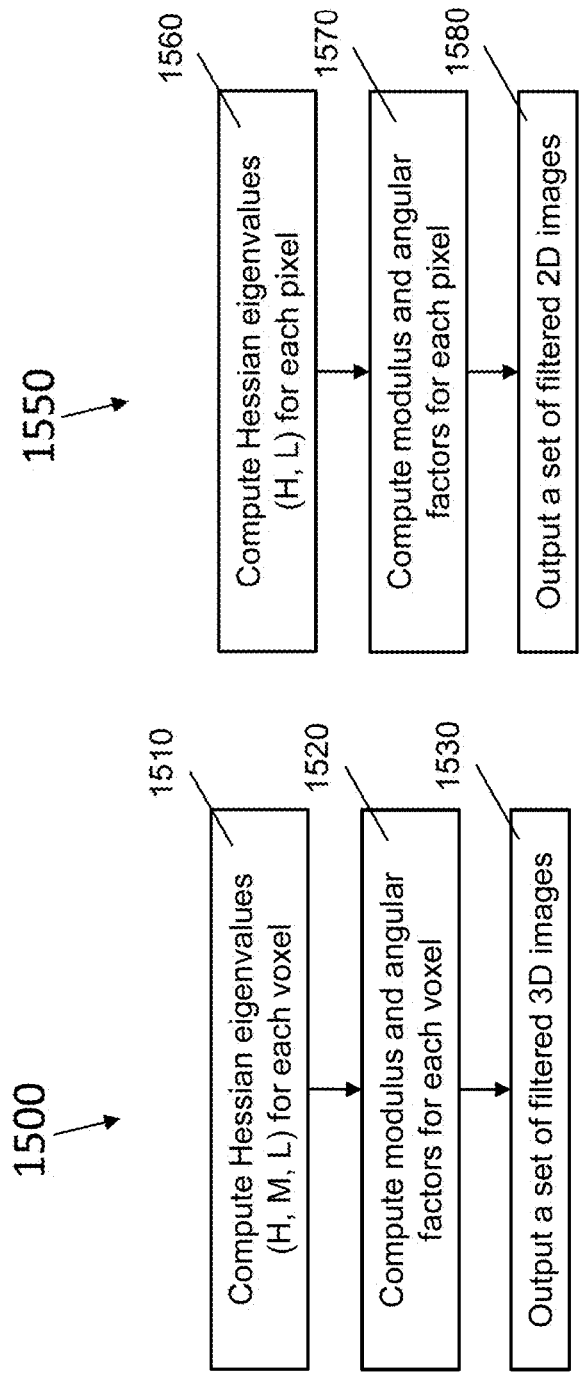
FIG. 15A is a block diagram of a method for applying a rotationally invariant 3D filter, according to an illustrative embodiment.
FIG. 15B is a block diagram of a method for applying a rotationally invariant 2D filter, according to an illustrative embodiment.

FIG. 15A shows an illustrative example of a method 1500 for applying a set of rotationally invariant 3D texture filters to a set of second-derivative images. Method 1500 includes computing, for each second-derivative image, three eigenvalues (H, M, and L) for each voxel of the second-derivative image (step 1510). As described above, an eigenproblem is solved for a 3×3 matrix (Matrix 1 above) associated with the second-derivative images in order to determine a highest eigenvalue (H), a middle eigenvalue (M), and a lowest eigenvalue (L) for each voxel of the 3D image.

In step 1520, the Hessian eigenvalues (H, M, L) are used to compute a modulus (A) for the eigenvalues for each characteristic direction and compute angular factors (Φ) for each voxel and for each predefined characteristic direction. Each angular factor may be computed from a vector (H, M, L) comprising the three Hessian eigenvalues and one of the predefined characteristic direction (e.g., using Equation 1 above, e.g., using Equation 2 above). Thus, a set of angular factors can be produced that includes an angular factor (Φ) for each voxel of the original 3D image. These angular factors may then used along with their respective modulus (A) in step 1530 to generate a set of filtered images. Each filtered image may include the angular factor, corresponding to a given characteristic direction, for each voxel of the original 3D image. Returning to FIG. 14A, after objects are identified in the 3D image, the filtered images (from step 1420) can be used to classify a portion (up to and including all) of the identified objects (step 1430) and/or to determine a quality of interest associated with the objects (step 1440). In certain embodiments, texture features are calculated in step 1450 using the identified objects (from step 1425) and the filtered images (from step 1420), and the texture features are used in object classification (step 1430) and determining a quality of interest (step 1440). For example, classification can include assigning objects to a class and/or associating objects with a category of interest. Each class may be for example related to a disease state or a phase in the cell cycle. For example, a linear combination of texture features (e.g., of objects) can be determined and used to classify an associated object, image, and/or sample according to a characteristic "Illness." For example, regression parameters, determined from training data, may be used in this classification (e.g., as described in association with FIG. 17 below). Additionally, the image or a biological sample (e.g., specimen) may also be classified as "Healthy" (e.g., to report the results of an image-based assay to a patient as a "negative" test result). Cells from another sample displaying a cancerous phenotype can be classified as "Cancerous", and, in certain embodiments, the associated sample may further be classified as a "positive" test result.

Figure 16:
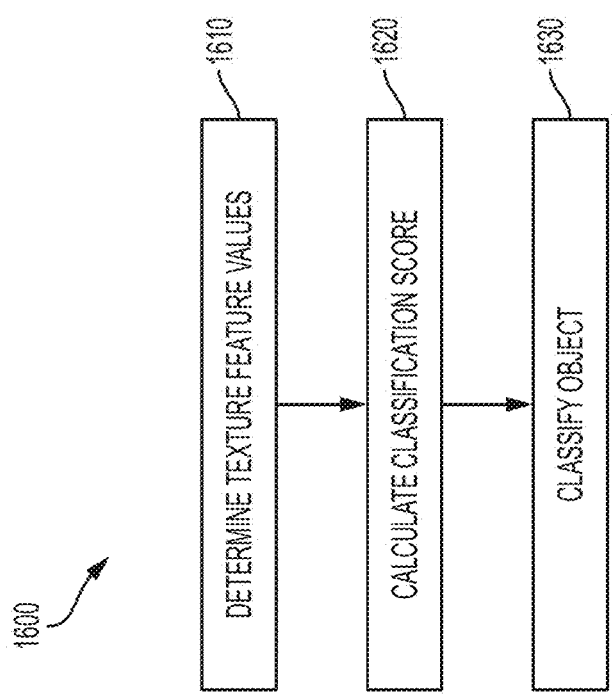
FIG. 16 is a block diagram of a method for classifying object(s) in an image, according to an illustrative embodiment.

FIG. 16 shows an illustrative example of a method 1600 for classifying objects in an image. Method 1600 includes determining texture feature values for the objects, using the filtered images (step 1610). Each texture feature value comprises a numerical value associated with a corresponding object. For example, a texture feature value may be an average image intensity value associated with an object in a filtered image. For example, an object that appears bright (e.g., has a high intensity) in a Bright Plane filtered image has a large Bright Plane texture feature value.

Figure 17:
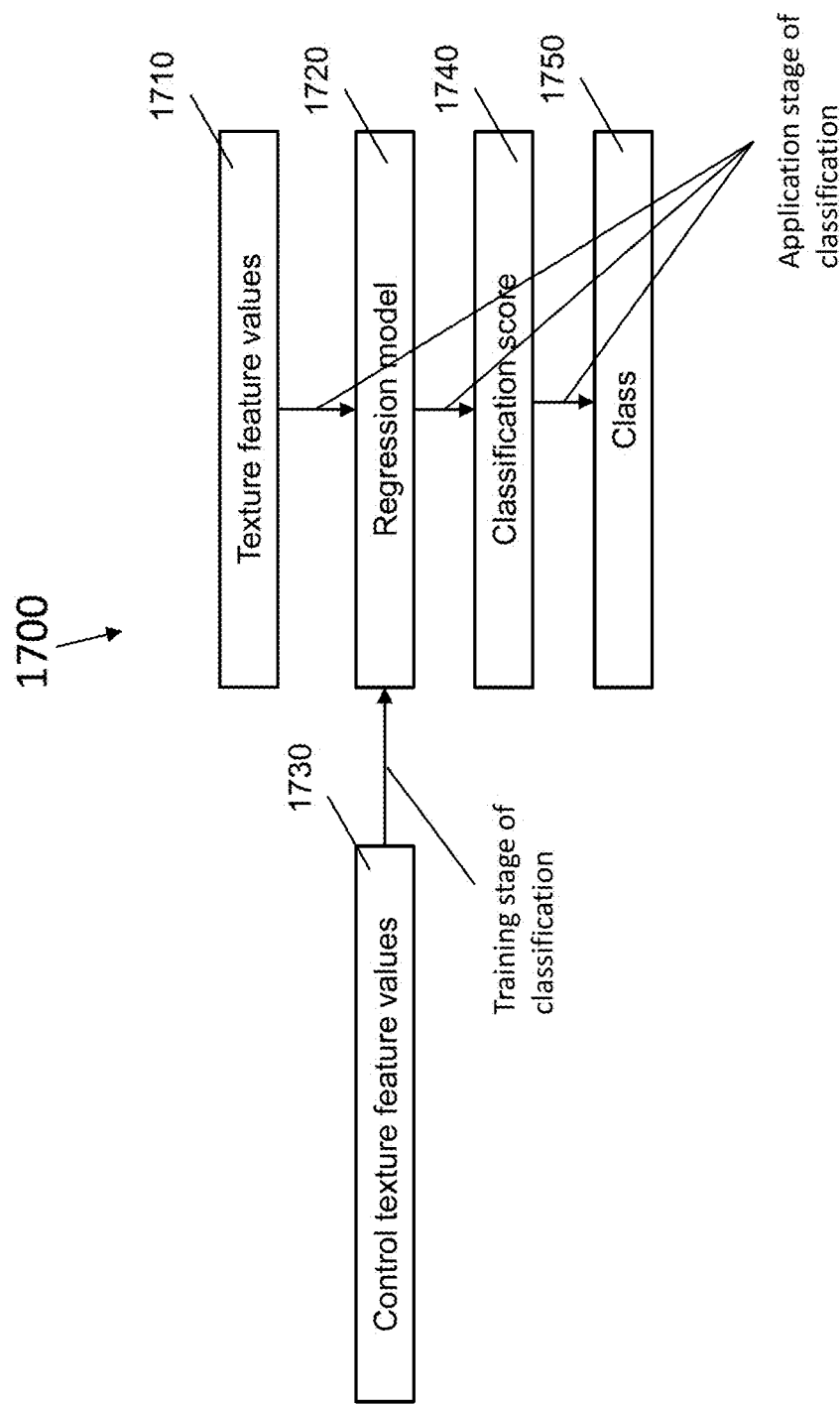
FIG. 17 is a block diagram illustrating the use of a regression model for calculating a classification score from texture feature values, according to an illustrative embodiment.

In step 1620, classification scores are calculated from the texture feature values. FIG. 17 shows an illustrative example 1700 of how classification scores 1740 are calculated from texture feature values 1710 using a regression model 1720. In certain embodiments, each classification score 1740 may comprise a numerical value associated with a predetermined class of objects. Regression model 1720 can use a method of statistical analysis, pattern recognition, or machine learning (e.g., linear discriminant analysis).

Regression model 1720 may be trained using control texture feature values 1730 (i.e., the texture feature values of control samples with known properties of interest). For example, in order to train regression model 1720 to calculate a classification score for a "Mitotic Cells" class, the control texture feature values include texture feature values for images of cells known to be undergoing mitosis. In certain embodiments, morphological feature values are also used to train regression model 1720, and morphological feature values are used along with texture feature values 1710 to calculate classification score 1740. Using classification score 1740, an object may, for example, be assigned to a class 1750. For example, class 1750 may be determined based on whether classification score 1740 is greater than or less than a predefined threshold corresponding to a given classification score 1740 and associated class 1750.

Training of regression model 1720 can be performed such that objects are identified by a user as belonging to at least one of two or more categories. Many texture and morphological features can be used to train regression model 1720. Morphological features are associated, for example, with the form, structure, and shape of an object. Morphological features can be represented by morphological feature values, for example, numerical values that describe cell size (e.g., cell radius), cell volume, and cell shape (e.g., cell aspect ratio, e.g., cell sphericity). Morphological feature values can also include a numerical score (or rank) corresponding to the extent to which a cell shares morphological characteristics with a given type of cell (e.g., a fibroblastic cell, a epithelial-like cell, or a lymphoblast-like cell). For example, the morphological feature value (on a scale of 0 to 10) of an elongated fibroblast cell may have a "fibroblastic" morphological feature value of 7 or greater, while a spherical lymphoblast may have a "fibroblastic" morphological feature value of less than 3.

To improve the speed of the classification process, it may be possible to narrow down the number of texture and morphological features used for classification to a manageable number, both for faster computation and to avoid over-fitting. For example, in certain embodiments, the number of texture and/or morphological features used for classification may be limited to 500, 250, 100, 50, 25, 15, 10, 9, 8, 7, 6, 5, 4, 3, or 2 features. Additionally, a subset of those features that are most effective for distinguishing objects such as cells can be identified (e.g., relevant features can be selected) and used for subsequent classification tasks.

Returning to FIG. 16, in step 1630, the calculated classification score(s) (from step 1620) are used to classify a portion (up to and including all) of the objects that were identified in the image. In certain embodiments, one or more filtered images may be used to classify the original 3D image (e.g., rather than discrete objects in the image) and/or a sample associated with the image (e.g., the population of cells that were imaged).

Returning to FIG. 14A, in certain embodiments, the filtered images and, optionally, the identified objects are used to segment objects in the 3D image (step 1435) and/or to segment the 3D image (step 1445). The 3D image can be segmented to separate the identified objects from the 3D image. Segmenting can include, for example, applying an intensity threshold to the identified objects and to the filtered image. A binary image may then be generated based on the applied threshold. Image segmentation can be performed, for example, to identify and separate discrete portions of the objects (e.g., corresponding to a subsection of a cell, e.g. a mitotic spindle).

In certain embodiments, it is desirable to be able to segment cells at the same phase of the cell cycle (e.g., mitotic cells) from surrounding cells to identify, for example, the relative population of mitotic cells and develop correlations between mitosis and other cellular features (e.g., morphological features). In certain embodiments, it is also desirable to perform segmentation to automatically distinguish between regions of the image corresponding to particular cell types and other parts of the image corresponding to a different cell type or a substrate material. Then, if the goal of the analysis is to identify any cells in metaphase, the cells can be further analyzed for the presence of chromosomes along a central axis by performing additional image processing (e.g., including another stage of segmentation) only on the previously identified mitotic regions of the image. In other words, image segmentation can allow a user to focus imaging efforts on only those portions of a cell population associated with mitosis, for which advanced image analysis is needed. Advanced image analysis may involve, for example, image reconstruction for the quantitative analysis of the distribution of a fluorescent probe in one or more target organelles. The portions of an image outside those target organelles may not be required for the analysis, and processing time spent on those portions would be wasted in the absence of segmentation, resulting in reduced efficiency.

As described above, the filtered images (from step 1420) can be used to determine a quality of interest value in step 1440. For example, a quality of interest may be a numerical value corresponding to a kind, type, and/or extent of a biological response to a given treatment (e.g., exposure to a pharmacological agent, a virus, or a signal pathway inhibitor). A quality of interest can also be a numerical value corresponding to physical properties of an object (e.g., cell radius, e.g., cell aspect ratio). A quality of interest can be determined by calculating texture feature values for a portion of the identified objects. A regression model (e.g., similar to regression model 1720 of FIG. 17 used to calculate a classifications score) is then used to determine the quality of interest value from a regression model evaluated using the texture feature values. The regression model includes regression parameters based on texture feature values of control objects (e.g., numerical values corresponding to cells with a known kind, type, and/or extent of a response, e.g., cells in a known phase of the cell cycle). In certain embodiments, morphological feature values are also determined for the identified objects, and the morphological feature values are used with the texture feature values to determine quality of interest(s). In certain embodiments, one or more filtered images are used to determine a quality of interest for the original 3D image (e.g., rather than for discrete objects in the image) and/or a sample associated with the image.

In certain embodiments, at least one of the filtered images (from step 1420) and/or the results of (a) classifying objects (step 1430), (b) segmenting objects (step 1435), and/or (c) determining quality of interest(s) (step 1440) are displayed (e.g., on the display or monitor of a computing device).

Cases of Rotational Invariance in x and y but not in z

In certain embodiments, the orientation of an object is not important for subsequent segmentation, classification, and/or analysis (e.g., an object of interest has equal probability density to be oriented in any direction). However, in other embodiments, the vertical and horizontal orientation of an object is important (e.g., for subsequent segmentation, classification, and/or analysis). Under these conditions, the approach described above for a rotationally invariant image (e.g., the image of the spinner shown in FIG. 1) can be modified to account for object orientation. For example, a rotationally invariant filter characterizing lines (or planes) may be split into two filters where one filter is sensitive to vertical lines (or planes) and the other filter is sensitive to horizontal lines (or planes). Similar splitting can be performed for Bright Saddle and Dark Saddle filters since the ideal intensity landscape corresponding to each of the filters has a symmetry axis.

To split a filter (e.g., a Bright Line filter) into vertical and horizontal components, information is determined, for each voxel, about the orientation of the Hessian eigenvector with the lowest eigenvalue (L) along with information about the Hessian eigenvalues (H, M, L). For example, for a Bright Line filter, the angle between the Hessian eigenvector with the lowest eigenvalue and the z-axis of the sample is determined, along with the Hessian eigenvalues. For a Dark Line filter, the angle between the Hessian eigenvector with the highest eigenvalue and z-axis is determined. For plane filters (e.g., a Bright Plane filter or a Dark Plane filter), information is also extracted about the angle between a Hessian eigenvector and z-axis.

The orientation of a plane may be defined by its normal vector which is an eigenvector of the lowest eigenvalue for the Bright Plane filter and an eigenvector of the highest eigenvalue for the Dark Plane filter. For example, the value of the cosine-square of the angle between the z axis of the 3D image and the eigenvector of interest may be calculated for all voxels. Two components of the plane-filtered image may then be calculated in which the horizontal component is proportional to the cosine-square of the angle and the vertical component is proportional to the sine-square of the angle.

For line filtered images, a similar approach may be used. The orientation (i.e., the symmetry axis of the ideal intensity landscape) of a Bright Line filter may be given by the Hessian eigenvector of the highest Hessian eigenvalue (H), while the orientation of a Dark Line filter may be given by the Hessian eigenvector of the lowest Hessian eigenvalue (L). The vertical component of a line filtered image can be calculated by multiplying the filtered image by the cosine-square of the angle between the z axis of the 3D image and the characteristic direction of the filter. The horizontal component of a line filtered image may be calculated by multiplying the filtered image by the sine-square of the same angle. Texture filter values can be nonnegative for all voxels.

Correction of Image Anisotropy

Optical 3D images typically have a lower resolution in the z dimension than in the x and y dimensions, resulting in image anisotropy (e.g., a directional dependence in image resolution). For example, the point spread function (PSF) of a confocal laser scanning microscope can be elongated in the z direction rather than being a spherical spot of equal radius in each dimension. A point spread function (PSF) may describe the response of an imaging system to a point source (e.g., a point source of light observed by an imaging system) or a point object (e.g., a small spherical or circular object). In certain embodiments, anisotropy can be corrected to prevent distortion of the texture-filtered images described herein.

Image deconvolution may be used, in certain embodiments, to correct for the anisotropy of the resolution of 3D images and mitigate distortions in the texture-filtered images. However, for certain implementations, deconvolution can be too expensive (e.g., with respect to calculation time). Moreover, deconvolution may not always be perfect and can yield images with residual PSF anisotropy.

Therefore, a more cost-effective (e.g., in terms of calculation time) approach than deconvolution may be used, in certain embodiments, for correcting image anisotropy. In certain embodiments, a Gaussian filter can be applied to a 3D image in all three directions (x, y, and z), and the Gaussian kernel used in the filter can be larger (e.g., "wider") in the x and y directions than in the z direction. After applying the Gaussian filter, a difference in resolution may still be present. In the Gaussian approximation, the PSF can have a characteristic radius which may be different in one or more of the directions (x, y, and z). For a point source, the image intensity (I) associated with the PSF can be approximated by:

$$I(x, y, z) = I_0 \exp\left(-\frac{x^2 + y^2}{2\sigma_x^2} - \frac{z^2}{2\sigma_z^2}\right) \quad (3)$$

where $\sigma_x$ is the standard deviation of I in the x and y directions and $\sigma_z$ is the standard deviation of I in the z direction.

Therefore, second-order derivatives calculated in different directions at a point source may not be equal. For example, the second derivative of the intensity at the center of the point source with respect to x and z, respectively, are:

$$\left.\frac{\partial^2}{\partial x^2} I\right|_{x=y=0} = -\frac{I_0}{\sigma_x^2} \quad (4)$$

$$\left.\frac{\partial^2}{\partial z^2} I\right|_{x=y=0} = -\frac{I_0}{\sigma_z^2} \quad (5)$$

The methods described herein provide a means for correcting this anisotropy such that, for a point source, values of second derivatives are equal in each direction. In certain embodiments, this correction may be performed by multiplying first-order partial derivatives calculated in the z direction by a constant factor, the coefficient of correction corresponding to $\sigma_z/\sigma_x$.

The numerical value of the coefficient of correction can be estimated empirically, e.g. by using a control image (e.g., a micrograph of beads) and maximizing the ratio of the intensity of a spot-filtered image (e.g., Bright Spot filtered image) of the control image to the intensity of a line-filtered image (e.g., Bright Line filtered image) of the control image. For example, for a water immersion microscope objective with a 63× magnification and a numerical aperture of 1.15 and using a Gaussian filter with a scale of (2.0, 2.0, 0.0), an estimated coefficient of correction is C=2.5

Figure 10:
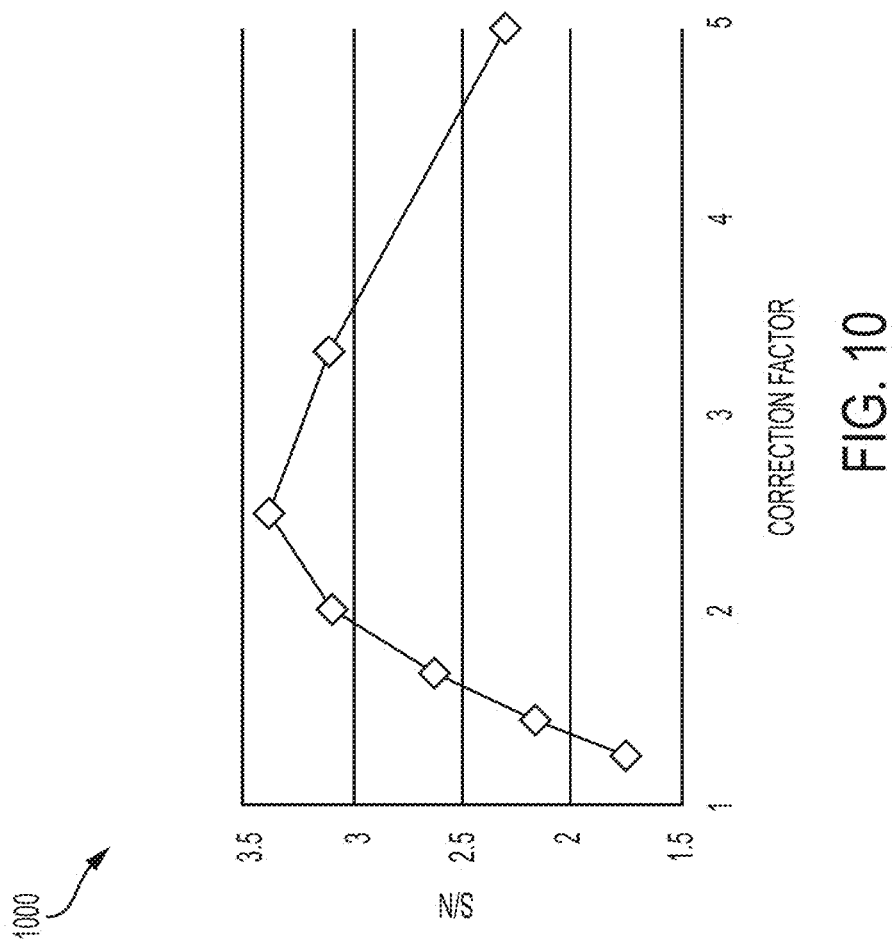
FIG. 10 is a plot of signal-to-noise ratio (S/N) of interphase-metaphase separation calculated using two texture features of nuclei, the Dark Line feature of the Hoechst channel and the Dark Spot feature of the Alexa 488 channel, versus the coefficient of correction for the z dimension, according to an illustrative embodiment of the invention.

In certain embodiments, the coefficient of correction is calculated empirically by maximizing the separation between the distributions of two classes of observations (e.g., using a method of linear discriminant analysis, e.g., by a maximizing a signal-to-noise ratio (S/N) of a linear combination of features from a verification data set corresponding to two different known classes of samples). For example, for two known classes of objects, the S/N of a linear combination of features may be the ratio of the absolute value of the difference of the features within each class divided by the between-class standard deviation. By maximizing the S/N, an optimal linear combination of features can be selected to improve subsequent classification, segmentation, and/or other analysis. For example, S/N may be evaluated at different values of the coefficient of correction in order to identify the value of the coefficient of correction that maximizes S/N. In certain embodiments, images of the same type of object (e.g., cells) from two different classes (e.g., in interphase and in metaphase) may be used to reduce the influence of random fluctuations. An example of this optimization is shown in FIG. 10 and described below.

Calculation of Texture Features in a Number of Binning Cascades

The properties of filtered images are functions of the scale of the Gaussian smoothing filter that is used (or the parameters of any other smoothing operations performed prior to applying the second derivative filter to the original images). The scale of a Gaussian smoothing filter is the characteristic radius of the Gaussian kernel used in the filter. The number of texture features extracted from a filtered image is a product of the number of features associated with a given scale (e.g., rotationally invariant 3D features can have nine features).

In certain embodiments, an original image may be binned to decrease the dimensions of an image (e.g., the number of voxels or pixels in an image). Binning can include combining adjacent voxels of an image, summing adjacent voxels of an image, averaging adjacent voxels of an image, or the like. Binning can be performed in one or multiple binning cascades, where each cascade has a corresponding binning factor. For example, if the set of binning factors (2, 2, 1), (4, 4, 1), and (4, 4, 2) are used to bin an original image with dimensions of (500, 300, 30), the first, second, and third binned images—corresponding to binning factors (2, 2, 1), (4, 4, 1), and (4, 4, 2)—have dimensions of (250, 150, 30), (125, 75, 30), and (125, 75, 15), respectively. Each of the binning factors may include a coefficient for each dimension of the original image. The calculation time required to determine texture feature values in all three of these example binning cascades may be less than 40% of the time needed to determine texture features from the single original image. An analogous approach may be used to bin 2D images.

In certain embodiments, texture features extracted in a higher order (e.g., third or fourth) binning cascade may be more effective for classification than the texture features obtained from the original image (e.g., at its original dimensions). As described above, texture features can be determined more quickly in the binned images. Calculation time decreases approximately proportionally with the number of voxels (or pixels) in the image. For example, a binning factor of two in each dimension of a 3D image can decrease overall calculation time by a factor of about eight.

Use of a 2D Rotationally Invariant Texture Filter

It should be understood that a similar approach to that described above (primarily with respect to 3D images) can also be applied to two-dimensional (2D) images. Elements (and/or modifications thereof) of embodiments described above with respect to the 3D rotationally invariant texture filter may be used in various embodiments of the 2D rotationally invariant texture filter described herein. For example, it is contemplated that features of claims related to the 3D rotationally invariant texture filter described herein can be used in apparatus, articles, systems, and/or methods of any of the claims related to the 2D rotationally invariant texture filter.

Application of the full set of Gaussian second derivative filters to a 2D image produces three derivative images denoted by $L_{xx}$, $L_{yy}$, and, $L_{xy}$. Two eigenvectors and two eigenvalues (H and L) can be calculated from the Hessian matrix that includes these values calculated for each pixel. In the space of eigenvalues, five predefined characteristic directions, corresponding to the vectors (1,1)/sqrt(2), (1,0), (1,−1)/sqrt(2), (0,−1) and (−1,−1)/sqrt(2), correspond to the Dark Spot, Dark Line, Saddle, Bright Line and Bright Spot filters, respectively. A filtered image (F) can be calculated from the eigenvalues (H and L) and the angle ($\alpha$) between the direction of the vector (H, L) and the characteristic direction of the filter, according to Equation (6):

$$F = A\Phi = \begin{cases} \sqrt{H^2 + L^2}\,(1 + \cos(4\alpha))/2 & \text{if } \alpha < \pi/4 \\ 0 & \text{otherwise} \end{cases} \quad (6)$$

Equation (6) can also be expressed in terms of the $\cos(\alpha)$ according to Equation (7):

$$F = \begin{cases} \sqrt{H^2 + L^2}\,(1 + 4\cos^4(\alpha) - 4\cos^2(\alpha)) & \text{if } \cos(\alpha) < \cos(\pi/4) \\ 0 & \text{otherwise} \end{cases} \quad (7)$$

Figure 14B:
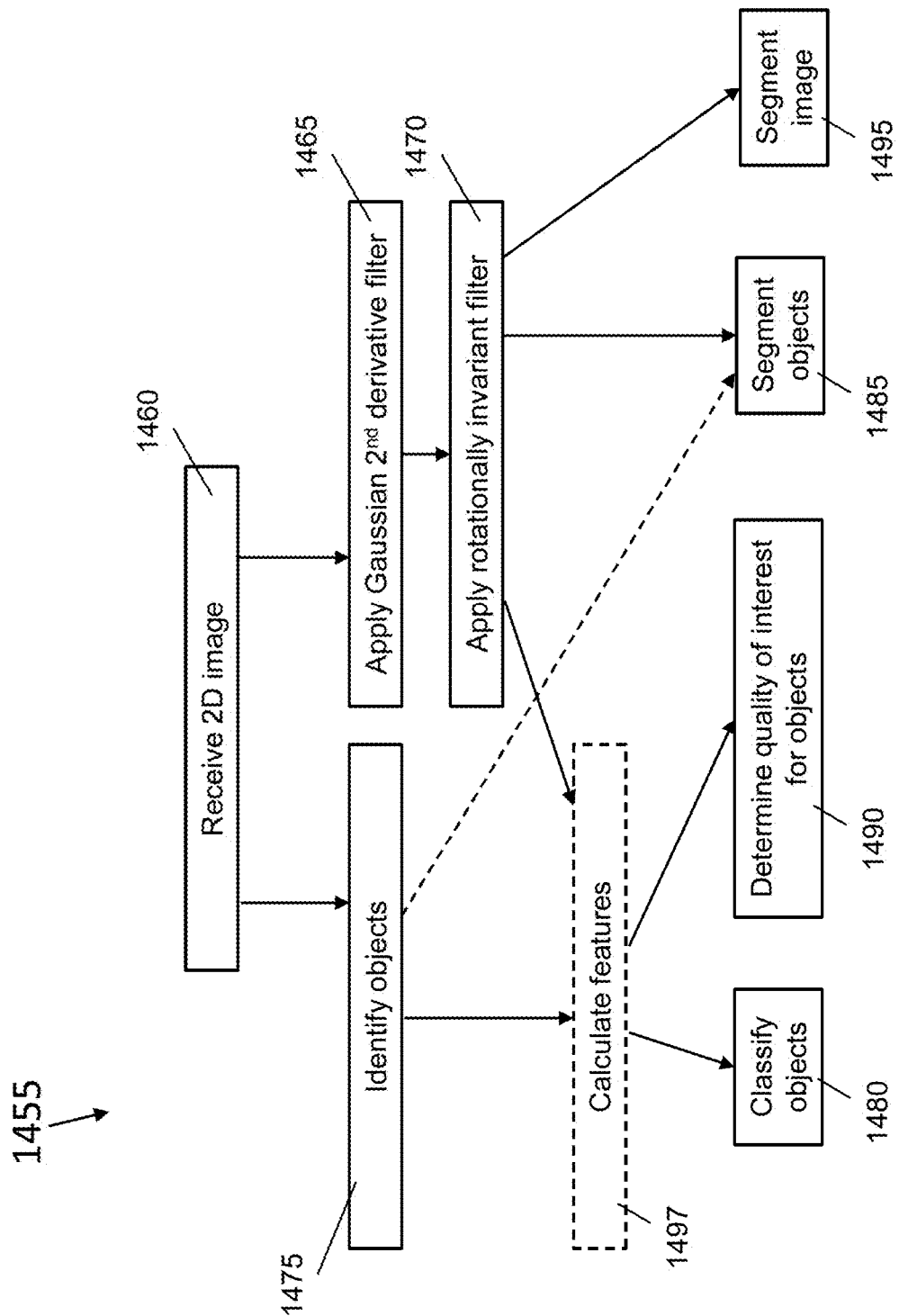
FIG. 14B is a block diagram of a method for 2D image analysis, according to an illustrative embodiment.

FIG. 14B shows an illustrative example of a method 1455 for performing 2D image analysis, according to an illustrative embodiment. Method 1455 may include receiving, by the processor of a computing device, a two-dimensional (2D) image (step 1460). For example, the 2D image may be a 2D image of a sample obtained by an optical microscope). A 2D image may also be a cross section (e.g., an image "slice") of a 3D image obtained, for example, using a 3D optical microscope, a computed tomography (CT), or micro-CT imaging system. After the 2D image is received, a set of (e.g., three) second-derivative filters (e.g. Gaussian second-derivative filters) is applied to the 2D image in step 1465 to produce a corresponding set of second-derivative images. For example, the set of second-derivative filters can include a finite-impulse-response (FIR) approximation to a Gaussian derivative filter or a recursive infinite-impulse-response (IIR) approximation to a Gaussian derivative filter (e.g., applied via a method of Deriche (1992) or van Vliet et al. (1998)).

In step 1470, a set of (e.g., five) rotationally invariant 2D texture filters to the set of second-derivative images (produced in step 1465) using a set of predefined characteristic directions to produce a corresponding set of (e.g., five) filtered images. In certain embodiments, each filter of the set of rotationally invariant 2D texture filters is associated with a corresponding predefined characteristic direction.

FIG. 15B shows an illustrative example of a method 1550 for applying a set of rotationally invariant 2D texture filters to a set of second-derivative images. Method 1550 includes computing, for each second-derivative image, the two eigenvalues, H and L, for each voxel of the second-derivative image (step 1560).

In step 1570, the Hessian eigenvalues (H and L) may be used to compute angular factors for each voxel and for each predefined characteristic direction. Each angular factor is computed from a vector (H, L) comprising the two Hessian eigenvalues and one of the predefined characteristic directions (e.g., using Equation 6, e.g., using Equation 7). Thus, a set of angular factors is produced that includes an angular factor ($\Phi$) for each pixel of the original 2D image. These angular factors may then be used in step 1580 to generate a set of filtered images. Each filtered image may have taken into account the modulus and the angular factor, corresponding to a given characteristic direction, for each pixel of the original 2D image.

Returning to FIG. 14B, objects (e.g., cells, e.g., portions of cells, e.g., mitotic spindles) may be identified in the 2D image (step 1475). For example, objects can be identified using a method of automatic object recognition such as local thresholding. During thresholding, for example, regions of an image associated with a given object with an average intensity either above or below a predefined threshold value may be identified as objects. For example, one channel of a multi-channel 2D image may be used to view a nuclear stain, and the associated images may be used to identify cell nuclei (e.g., by applying a local threshold based on the relative brightness of the nuclei versus surrounding cellular space). During thresholding, for example, regions of an image with an average intensity either above or below a predefined threshold value may identified as objects.

The filtered images can be used to classify a portion (up to and including all) of the identified objects (step 1480), segment the 2D image (step 1485) and/or determine a quality of interest value (step 1490), using methods analogous to those described above with respect the use of a 3D rotationally invariant texture filter. Object classification in step 1480 may proceed via method 1600 of FIG. 16, as described above in the context of 3D image analysis. In certain embodiments, texture features may be calculated in step 1497 using the identified objects (from step 1475) and the filtered images (from step 1470), and the texture features may be used in object classification (step 1480) and determining a quality of interest (step 1490). The filtered image (s) can also be used directly to segment the 2D image (step 1495).

EXAMPLE APPLICATIONS

After objects (e.g., cells) have been identified in an image, the set of texture-filtered images can be used to calculate a corresponding set of texture features for the objects. For a 3D image, texture features can be calculated based on the set of nine filtered images and may be used in classification or regression tasks. In certain embodiments, further extracted features are determined based on higher order cumulants (e.g., in addition to an average, or first cumulant) of an intensity distribution (e.g., standard deviation, the square root of the second cumulant). Example experimental applications of the systems and methods described herein are presented in the following.

Example 1: Classification of HeLa Cells in Different Stages of Life Cycle

Figure 3:
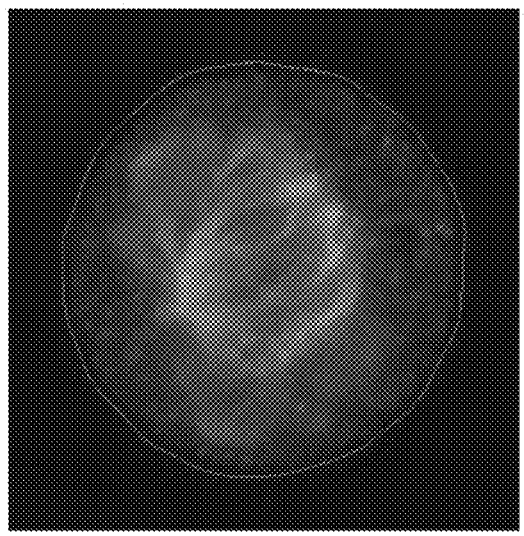
FIG. 3 is a fluorescence micrograph of a mitotic HeLa cell taken along the central plane of a 3D image of a cell with a fluorescent tubulin stain.

HeLa cells were imaged in three dimensions at different stages of their life cycle and were measured using several image channels with different fluorescent markers. Cell nuclei were stained with HOECHST® 33342; tubulin was stained with anti-α-tubulin labeled with ALEXA FLUOR' 448; Phosphohistone H3 (pHH3) was stained with anti-phosphohistone H3 labeled with ALEXA FLUOR" 647, and actin was stained with Tetramethylrhodamine (TRITC)-labeled phalloidin. The ALEXA FLUOR" 448 channel was used to detect the cytoplasm. FIG. 3 shows a cross section image 300 along the central axis of a fluorescence image of a HeLa cell showing the fluorescent channel for the tubulin stain.

The intensity of the ALEXA FLUOR" 647 in the nuclei was used to detect cells undergoing mitosis, and all mitotic cells were cropped from the image and saved for further analysis. Additionally, a similar number of cells with zero (or negligible signal) in the ALEXA FLUOR" 647 channel were cropped and saved for further analysis. In order to decrease processing time, not all of the cells that lacked an ALEXA FLUOR" 647 signal were saved. Instead, a fraction of these cells were randomly selected in the image. In total, 1072 cells were cropped and saved for further analysis.

Features were then extracted from the cropped images. Intensity features were extracted based on the HOECHST® 33342, ALEXA FLUOR' 448, and ALEXA FLUOR™ 647 signals. Morphological features were extracted to detect cell nuclei and the combination of cell nuclei and cytoplasm. Some of the extracted morphological features included properties of regions associated with the ALEXA FLUOR™ 488 signal. Texture features were then extracted from images of the ALEXA FLUOR™ 488 and HOECHST® 33342 channels, using the methods described above. For each cell, 4 intensity features, 44 morphological features, and 108 texture features were extracted.

Each of the saved cells was then visually inspected by three skilled persons, who separated the cell images into the following categories: interphase, prophase, prometaphase, metaphase, anaphase, telophase-cytokinesis, and artefact. Each category (other than the artefact category) corresponded to the phase of the cell cycle in which the cell was imaged. The artefact category included any objects resulting from errors in segmentation and images of irregular cells (e.g., multinucleated cells). Images in the artefact category were discarded and not used in subsequent analyses.

In this example, the 1072 saved cells were separated into the following categories based on the visual criteria described below:

Interphase: cell images for this category corresponded to images of cells in interphase. Interphase is the resting phase between successive mitotic divisions of a cell (e.g., between the first and second divisions of meiosis). A majority of cells imaged had a phenotype associated with interphase. A cell image associated with interphase was characterized by a low intensity in the pHH3 (ALEXA FLUOR' 647) channel, a homogeneous stain intensity (of HOECHST® 33342) in the nucleus with brighter and dimmer zones, and a tubulin stain (ALEXA FLUOR' 448) indicative of irregular fibers (e.g., with visible centers where multiple fibers originate). Cells in interphase have an overall flat shape.

Prophase: cell images for this category corresponded to images of cells in prophase. Prophase is the first stage of mitosis. A cell image associated with prophase was characterized by an increased intensity in the pHH3 channel (e.g., an intensity greater than that of the background level) with some bright spots, a more granular nuclear stain intensity (e.g., indicating DNA condensation), a thicker nuclear region, and a tubulin stain indicative of two centers connected with fibers (microtubules) that primarily extend in the direction of the x-y plane of the cell. Cells in prophase have a mostly flat shape.

Prometaphase: cell images for this category corresponded to images of cells in prometaphase. Prometaphase is an intermediate phase of mitosis between prophase and metaphase. A cell image associated with prometaphase is characterized by a pHH3 stain that looks similar to the nuclear stain, a nuclear stain that suggests the formation of condensed DNA (e.g., that extends in the z-direction), and a tubulin stain indicative of fibers entering the nuclear region (e.g., with their poles moving towards opposite sides of the nuclear region).

Metaphase: cell images for this category corresponded to images of cells in metaphase. During metaphase, chromosomes become attached to spindle fibers. A cell image associated with metaphase is characterized by a pHH3 stain that looks similar to the nuclear stain, a nuclear stain showing condensed DNA arranged into a vertical disk, and a tubulin stain in which two poles at both sides of the disk include fibers that form a symmetric spindle with an axis through the center of the disk. Cells in metaphase have an overall round shape.

Anaphase: cell images for this category corresponded to images of cells in anaphase. During anaphase, chromosomes move away from one another to opposite poles of the spindle observed in metaphase. A cell image associated with anaphase is characterized by a pHH3 stain that looks similar to the nuclear stain and a nuclear stain indicating the division of the condensed DNA disk into two parallel disks. Cells in anaphase have a mostly round shape.

Telophase & Cytokinesis: cell images for this category corresponded to images of cells in telophase and images of cells undergoing cytokinesis. During telophase, chromosomes move to opposite ends of the cell and two nuclei are formed. During cytokinesis, the cell separates into two daughter cells. A cell image associated with telophase and/or cytokinesis is characterized by a decreased pHH3 stain intensity, a nuclear stain showing separated clumps of DNA that are moving apart, and a tubulin stain showing a bundle of parallel fibers between the separated nuclei. During cytokinesis, the bundle of parallel fibers first stretches then constricts in the middle of the cell before two daughter cells are separated, leaving bright tubulin-rich regions at the newly formed cell borders. Two symmetric cells are then observed which separate and move apart. Cells in this category have a different appearance than cells in interphase.

Artefact: cell images for this category corresponded to images of cells with segmentation errors or irregular cells (e.g., cells with three nuclei).

Each category of cells was then filtered to remove outliers. Outliers were removed because Fisher Linear Discriminant, also referred to as Linear Discriminant Analysis (LDA), which was used for subsequent analysis, has a suboptimal accuracy when training data include outliers. Outliers were determined separately for each category, using a few selected features. Objects were considered outliers when their feature value deviated from the class average value by more than 12 standard deviations. Approximately 5% to 15% of cells (depending on the category) were discarded as outliers from each categorized set of cells.

Each category of cells was then divided into a training set and a verification set. The training set was used for determining relevant features and parameters of the classifier, while the verification set was used to characterize the quality (e.g., "goodness") of the results produced by the classifier. One suitable method of characterizing the goodness of a classifier is selecting three classes and plotting the verification data in LDA feature space, as a two-dimensional plot of the three selected classes. The separation of the classes in this plot can be used to qualitatively determine how effectively the different classes are separated. For example, some classes may be very well separated while other classes may tend to overlap. Some classes may not necessarily be discrete but there may be a continuous transition from one class to the other. It is also possible to select different subsets of features for classification. For example, classification can be based on intensity and morphological features, on texture features, or on all feature types.

Figure 7:
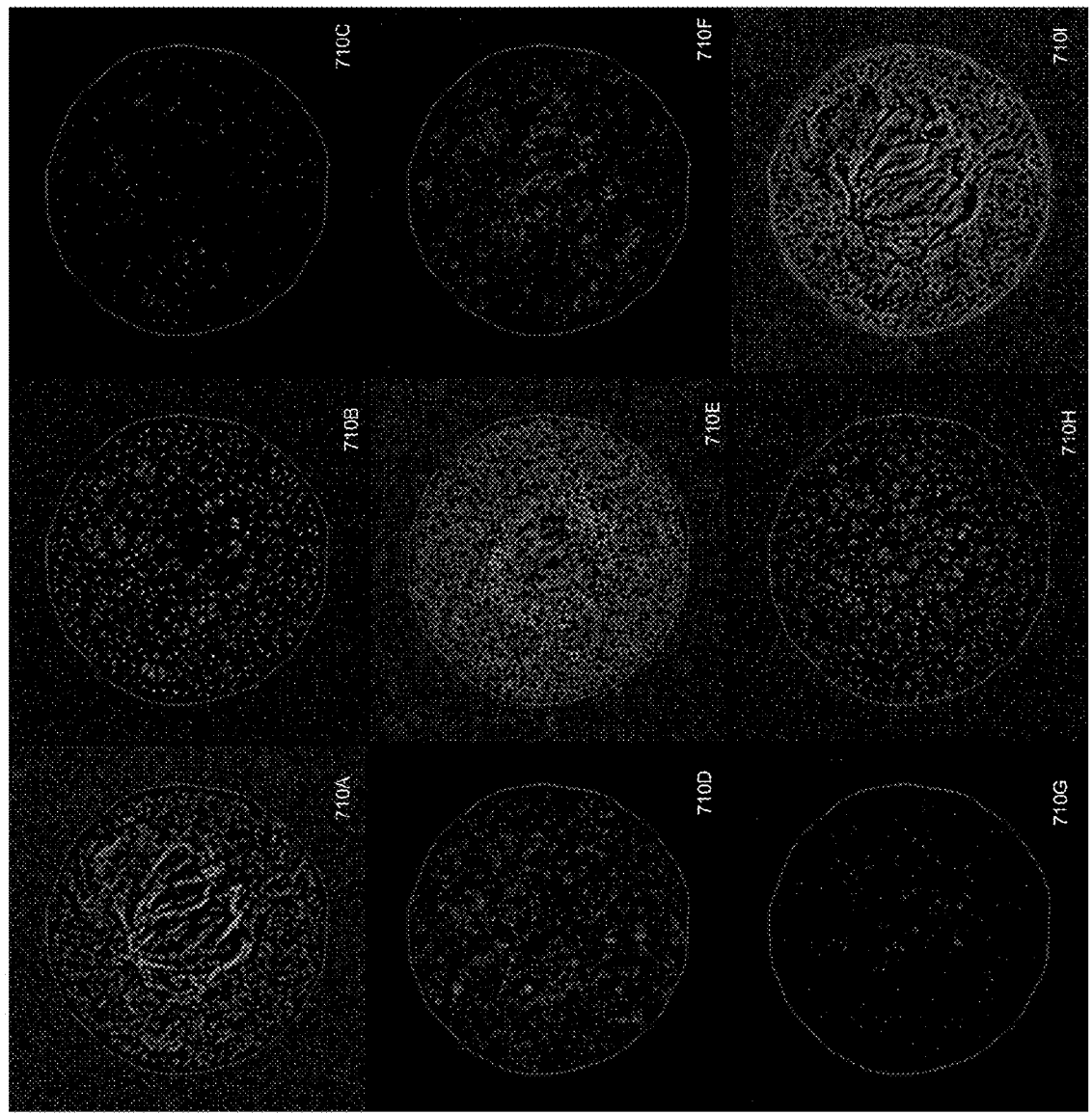
FIG. 7 shows texture-filtered images of the 3D image shown on FIG. 3. Images 710A-I correspond to the Bright Plane, Bright Line, Bright Spot, Bright Saddle, Saddle, Dark Saddle, Dark Spot, Dark Line, and Dark Plane filters, respectively.

Nine texture-filtered images of the image shown in FIG. 3 are shown in FIG. 7. Images 710A-710I correspond to texture-filtered images obtained with the Plane Bright, Line Bright, Spot Bright, Saddle Bright, Saddle, Saddle Dark, Spot Dark, Line Dark, and Plane Dark filters, respectively. Feature values determined from these filtered images were used in subsequent analyses.

Figures 8A, 8B, 8C:
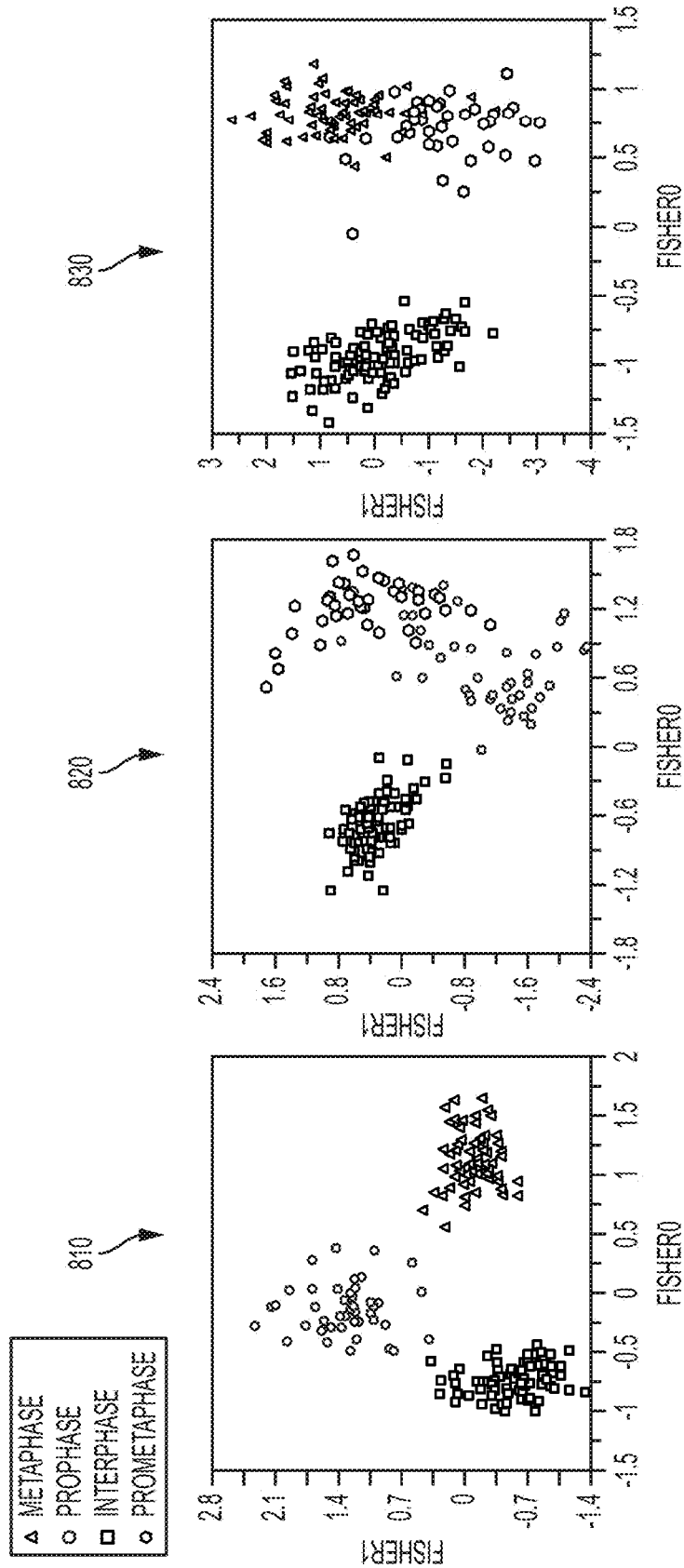
FIG. 8A is a plot of verification data used for classification in Linear Discriminant Analysis (LDA) feature space for interphase, prophase, and metaphase, according to an illustrative embodiment of the invention.
FIG. 8B is a plot of verification data used for classification in LDA feature space for interphase, prophase, and prometaphase, according to an illustrative embodiment of the invention.
FIG. 8C is a plot of verification data used for classification in LDA feature space for interphase, metaphase, and prometaphase, according to an illustrative embodiment of the invention.

Classification results in LDA feature space are shown in FIG. 8A, FIG. 8B, and FIG. 8C. FIG. 8A shows a plot 810 of classification results for images of cells in interphase, prophase, and metaphase. FIG. 8B shows a plot 820 of classification results for images of cells in interphase, prophase, and prometaphase. FIG. 8C shows a plot 830 of classification results for images of cells in interphase, metaphase, and prometaphase. Classification was performed using all extracted features. As shown in these figures, the prophase cluster tends to overlap with the prometaphase cluster, and the prometaphase cluster tends to overlap with the metaphase cluster. Clusters of the other pairs of classes are separate and do not overlap to a great extent.

FIG. 9A, FIG. 9B, and FIG. 9C show plots 910, 920, and 930, respectively, of classification results in LDA feature space for three classes—interphase, prophase, and anaphase. Classification was performed using intensity and morphological features (FIG. 9A), texture features (FIG. 9B), and all three (intensity, morphological features, and texture features) (FIG. 9C). Texture features were more effective for separating cell images for interphase and prophase (FIG. 9B) than were the intensity and morphological features (FIG. 9A). Classification was improved (e.g., the categories are more clearly separated) when all three features (intensity, morphological features, and texture features) were used for classification (FIG. 9C).

Example 2: Optimization of Coefficient of Correction

In this example, the coefficient of correction for adjusting the calculated derivatives in the z dimension was optimized by maximizing the S/N of the verification data set. The S/N for the verification data set used to classify cell images as interphase or metaphase cells was optimized using the methods described above. In this example, a fixed set of texture features (Dark Line features for the HOECHST® 33342 channel extracted for cell nuclei and Dark Spot features of the ALEXA FLUOR™ 488 channel also extracted for cell nuclei) were used to separate the images into interphase and metaphase classes. At each value of the coefficient of correction (between 1.25 and 5.0), two texture feature values were calculated for each image, and the linear classifier was optimized using the training set. S/N was then calculated for the verification set. The results of these calculations are shown in plot 1000 of FIG. 10, which shows a plot of S/N versus the coefficient of correction. The optimal coefficient of correction was approximately 2.5 for this example.

Example 3: Segmentation of Mitotic Spindle

Figure 11:
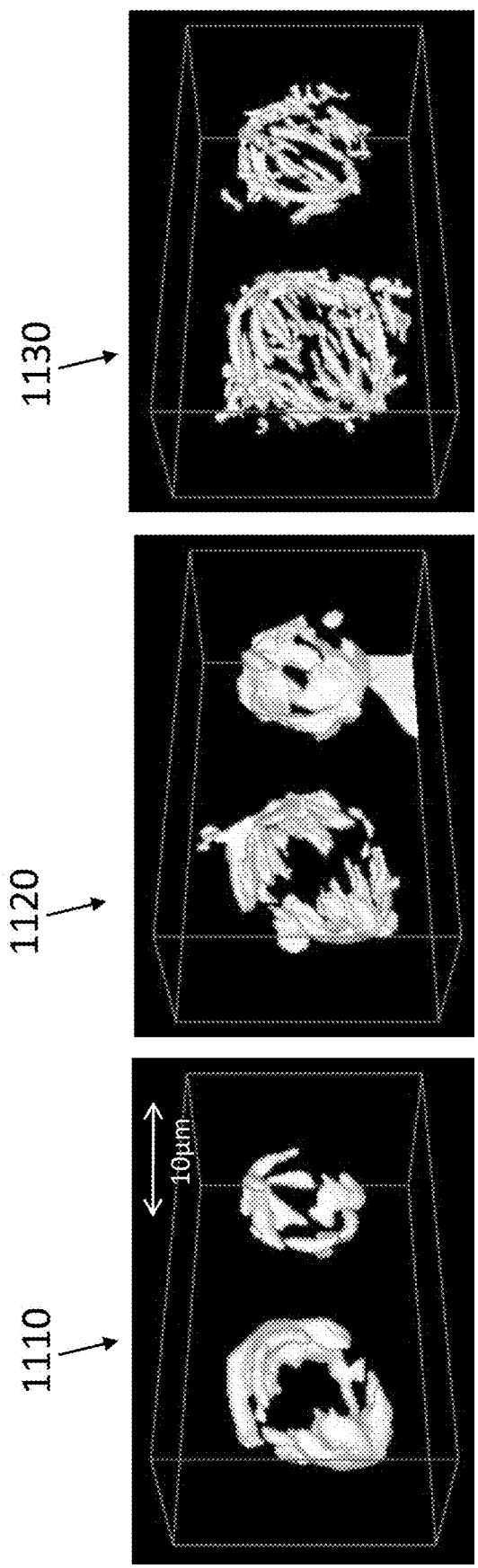
FIG. 11A is a 3D threshold mask of Gaussian filtered and deconvoluted an image of two cells in metaphase in the Alexa 488 channel, according to an illustrative embodiment of the invention.
FIG. 11B is a 3D threshold mask of a lowest Hessian eigenvalue filtered image of the same image used to generate the mask in FIG. 11A, according to an illustrative embodiment of the invention.
FIG. 11C is a 3D threshold mask image of a Bright Line filtered image of the same image used to generate the mask in FIG. 11A, according to an illustrative embodiment of the invention.

Using a Bright Line filtered image of a cell in metaphase, an intensity threshold was used to generate a mask of the mitotic spindle for a 3D image of two cells. Image 1110 of FIG. 11A includes a mask generated by applying an intensity threshold to the ALEXA FLUOR' 488 image of two cells in metaphase, after Gaussian filtering and deconvolution. Image 1120 of FIG. 11B includes a mask generated by applying an intensity threshold to a lowest Hessian eigenvalue filtered image from the same image used to create image 1110 of FIG. 11A. FIG. 11C shows image 1130 of a mask generated by applying an intensity threshold to a Bright Line filtered image from the same image used to create image 1110 of FIG. 11A. The mask generated from Bright Line filtered image 1130 (FIG. 11C) provides the best segmentation of the mitotic spindle.

Example 4: Cardiomyocytes-Actin Assay

In this illustrative experiment, cardiomyocytes (cardiac muscle cells) were cultured in two wells where one well ("treated") was treated with 30 nM endothelin 1 for 18 h and the other well ("control") contained untreated cells. Twenty images in different imaging fields were obtained for each well, and images were obtained in two channels, HOECHST® 33342 (nuclear stain channel) and TRITC (rhodamine-phalloidin stained F-actin channel).

Figure 12:
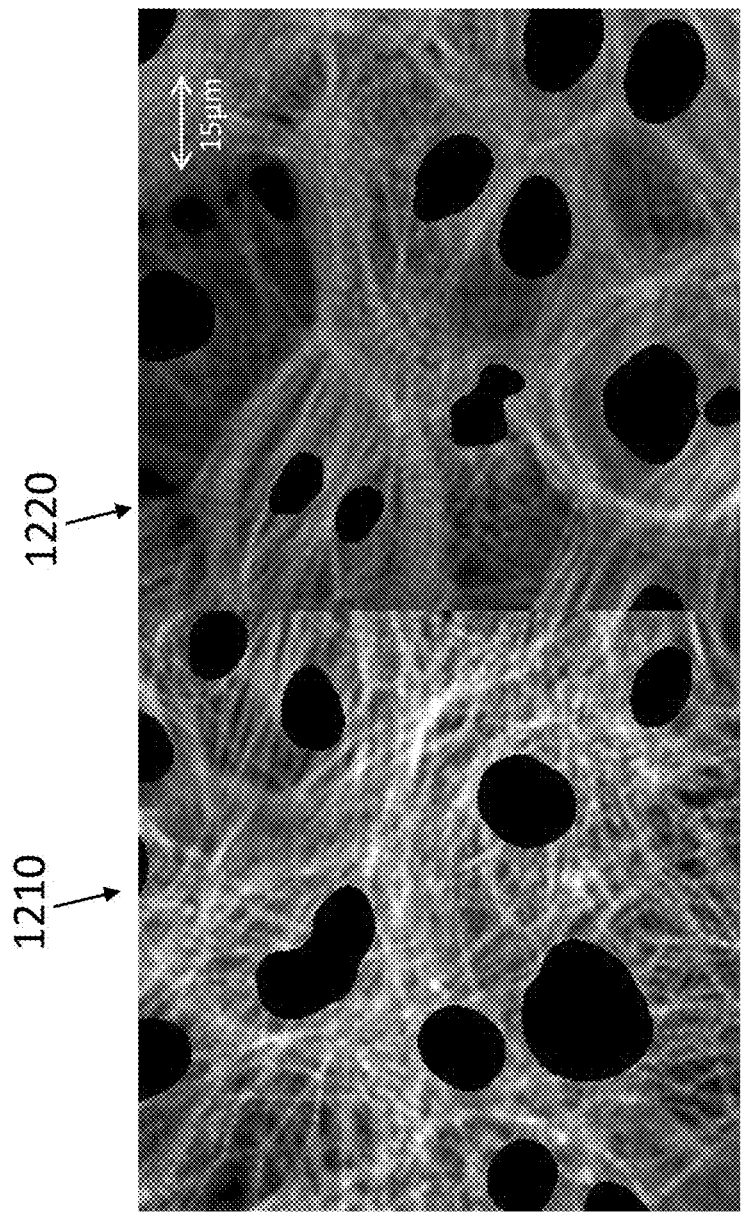
FIG. 12A is a plane fragment (e.g., a 2D image slice) from the TRITC channel of a 3D fluorescence micrograph of an untreated cell sample, according to an illustrative embodiment of the invention.
FIG. 12B is a plane fragment (e.g., a 2D image slice) from the TRITC channel of a 3D fluorescence micrograph of a cell sample treated with 30 nM endothelin 1 for 18 h, according to an illustrative embodiment of the invention.
Figure 13:
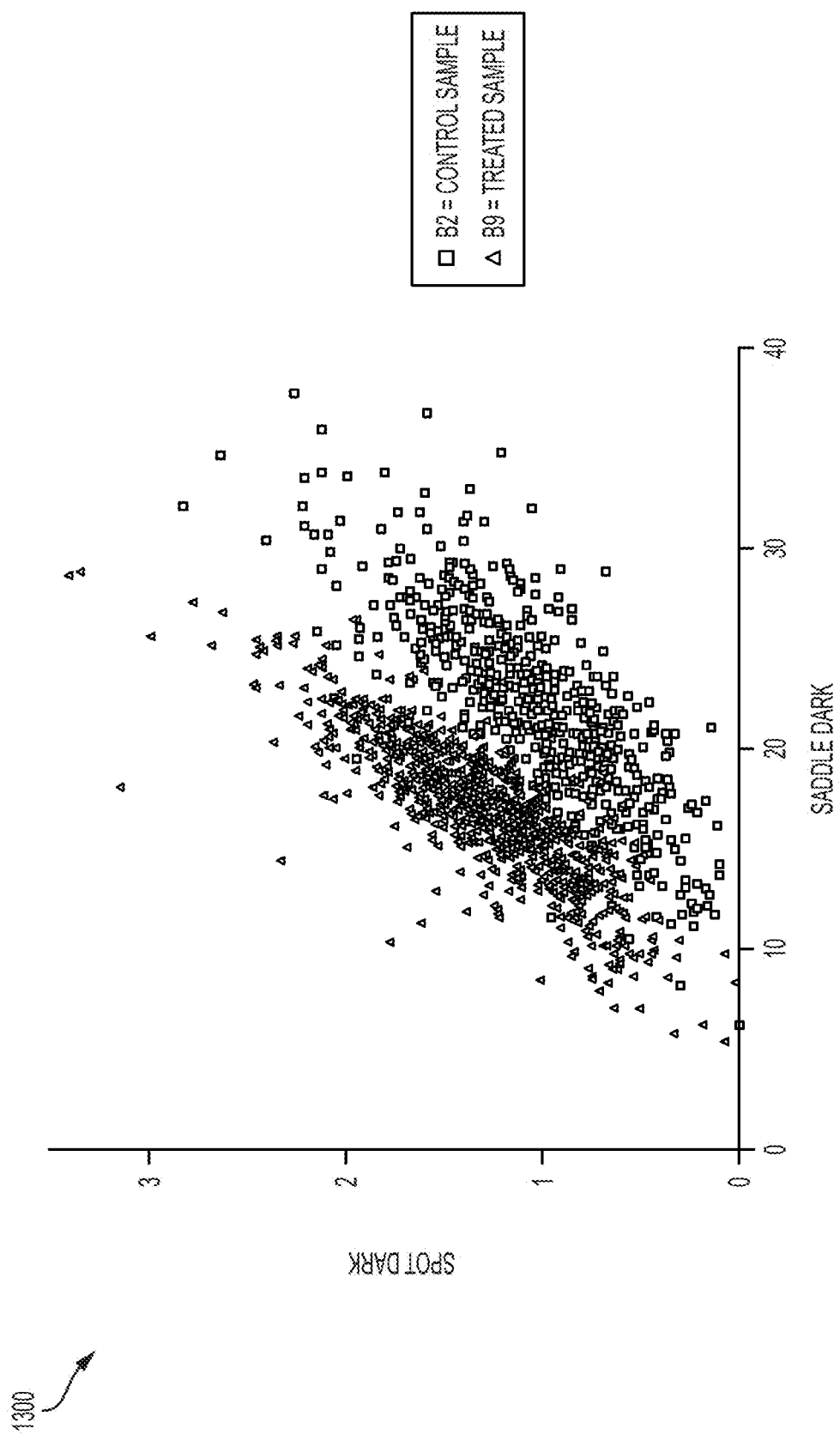
FIG. 13 is a plot of Dark Spot texture feature values versus Dark Saddle texture feature values extracted, using an illustrative embodiment of the methods described herein, from images of an untreated (e.g., control) cell sample (B2) and a cell sample treated with 30 nM endothelin 1 for 18 h (B9)

FIG. 12A and FIG. 12B show cross section images (e.g., plane fragments) 1210 and 1220 of 3D images of cells in the control and treated samples, respectively. Images 1210 and 1220 were obtained in the TRITC channel. Detected nuclei are black in these images. These images have a distinguishable texture in regions around the nuclei. However, using visual inspection only, it is difficult to discern any noticeable differences between the textures of the images of control and treated cells shown in FIG. 11A and FIG. 11B, respectively. For example, the image 1220 of the treated sample (FIG. 12B) only appears to have a slightly lower TRITC intensity than image 1210 of the control sample (FIG. 12A). Applying the texture filter described herein allows otherwise unobservable differences in the images to be identified. For example, as shown in plot 1300 of FIG. 13, the intensity of the Spot Dark filtered image 1220 of the treated sample (B9) is brighter than that of the control sample (B2). The opposite trend in image intensity was suggested based on a visual inspection (e.g., by a human) of the original images shown on FIG. 12A and FIG. 12B. Texture-filtered images, obtained as described herein, can thus be used to distinguish the two classes of cells (treated versus untreated cardiomyocytes) compared in this experimental example. This distinction would not have been possible through human effort.

System and Implementation

Figure 5:
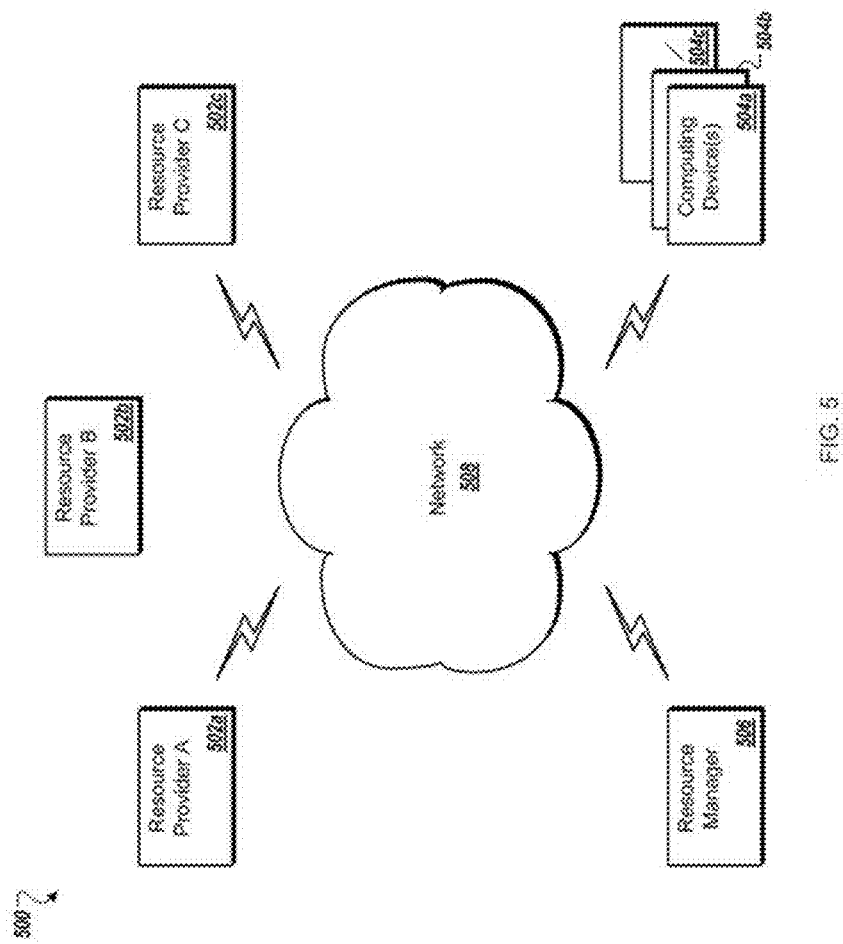
FIG. 5 is a block diagram of an example network environment for use in the methods and systems for automated segmentation and analysis of 3D images, according to an illustrative embodiment.

FIG. 5 shows an illustrative network environment 500 for use in the methods and systems for analysis of spectrometry data corresponding to particles of a sample, as described herein. In brief overview, referring now to FIG. 5, a block diagram of an exemplary cloud computing environment 500 is shown and described. The cloud computing environment 500 may include one or more resource providers 502a, 502b, and 502c (collectively, 502). Each resource provider 502 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 502 may be connected to any other resource provider 502 in the cloud computing environment 500. In some implementations, the resource providers 502 may be connected over a computer network 508. Each resource provider 502 may be connected to one or more computing device 504a, 504b, 504c (collectively, 504), over the computer network 508.

The cloud computing environment 500 may include a resource manager 506. The resource manager 506 may be connected to the resource providers 502 and the computing devices 504 over the computer network 508. In some implementations, the resource manager 506 may facilitate the provision of computing resources by one or more resource providers 502 to one or more computing devices 504. The resource manager 506 may receive a request for a computing resource from a particular computing device 504. The resource manager 506 may identify one or more resource providers 502 capable of providing the computing resource requested by the computing device 504. The resource manager 506 may select a resource provider 502 to provide the computing resource. The resource manager 506 may facilitate a connection between the resource provider 502 and a particular computing device 504. In some implementations, the resource manager 506 may establish a connection between a particular resource provider 502 and a particular computing device 504. In some implementations, the resource manager 506 may redirect a particular computing device 504 to a particular resource provider 502 with the requested computing resource.

Figure 6:
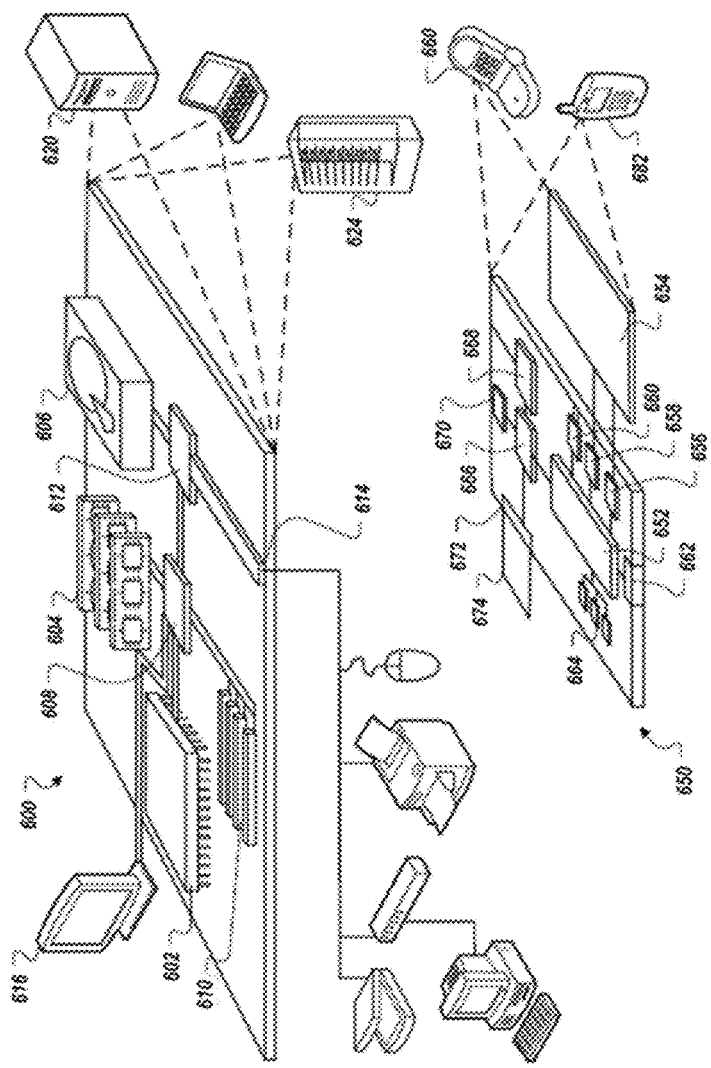
FIG. 6 is a block diagram of an example computing device and an example mobile computing device, for use in illustrative embodiments of the invention.

FIG. 6 shows an example of a computing device 600 and a mobile computing device 650 that can be used in the methods and systems described in this disclosure. The computing device 600 may represent various forms of digital computers, such as laptops, desktops, workstations, personal digital assistants, servers, blade servers, mainframes, and other appropriate computers. The mobile computing device 650 may represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, may be interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 may be a volatile memory unit or units. In some implementations, the memory 604 is a non-volatile memory unit or units. The memory 604 may also be another form of computer-readable medium, such as a magnetic or optical disk.

The storage device 606 may be capable of providing mass storage for the computing device 600. In some implementations, the storage device 606 may be or contain a computer-readable medium, such as a hard disk device, an optical disk device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 can manage bandwidth-intensive operations for the computing device 600, while the low-speed interface 612 can manage lower bandwidth-intensive operations. Such allocation of functions is an example only. In some implementations, the high-speed interface 608 can be coupled to the memory 604, the display 616 (e.g., through a graphics processor or accelerator), and to the high-speed expansion ports 610, which may accept various expansion cards (not shown). In the implementation, the low-speed interface 612 may be coupled to the storage device 606 and the low-speed expansion port 614. The low-speed expansion port 614, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, may be interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface or a DIMM (Double In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provided as a security module for the mobile computing device 650, and may be programmed with instructions that permit secure use of the mobile computing device 650. In addition, secure applications may be provided via the DIMM cards, along with additional information, such as placing identifying information on the DIMM card in a non-hackable manner.

The memory may include, for example, flash memory and/or NVRAM memory (non-volatile random access memory), as discussed below. In some implementations, instructions may be stored in an information carrier and, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth®, Wi-Fi™, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube), an LCD (liquid crystal display) monitor, or an LED (light emitting diode) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server may be remote from each other and may typically interact through a communication network. The relationship of client and server may arise by virtue of computer programs running on the respective computers and having a client-server relationship to each other.

While one or more aspects of the present disclosure have been particularly shown and described with reference to specific preferred embodiments, it should be understood by those skilled in the art that various changes in form and detail may be made therein without departing from the spirit and scope of the invention as defined by the appended claims.

What is claimed is:

1. A method of three-dimensional image analysis, the method comprising:
   receiving, by a processor of a computing device, a three-dimensional (3D) image comprising voxels;
   applying, by the processor, a set of second-derivative filters to the 3D image, thereby producing a corresponding set of second-derivative images;
   applying, by the processor, a set of rotationally invariant 3D texture filters to the set of second-derivative images using a set of predefined characteristic directions in Hessian eigenvalue space, thereby producing a corresponding set of filtered images;
   identifying, by the processor, using at least one of the set of filtered images or the 3D image, a plurality of objects in the 3D image; and
   performing, by the processor and using the set of filtered images, at least one of:
   (a) classifying a portion of the plurality of identified objects in the 3D image;
   (b) segmenting the 3D image to separate a portion of the plurality of identified objects from the 3D image; or
   (c) determining a quality of interest value for a portion of the plurality of identified objects in the 3D image.

2. The method of claim 1, wherein the classifying the portion of the plurality of identified objects in the 3D image comprises:
   determining, using the set of filtered images, texture feature values for a portion of the plurality of identified objects; and
   calculating one or more classification scores from the texture feature values and using the classification score(s) to classify each object of the portion of objects.

3. The method of claim 1, wherein the segmenting the 3D image to separate the portion of the plurality of identified objects from the 3D image comprises:
   applying an intensity threshold to the portion of the plurality of identified objects; and
   generating a binary image based on the applied threshold.

4. The method of claim 1, wherein the determining the quality of interest value for the portion of the plurality of identified objects in the 3D image comprises:
   determining, using the set of filtered images, texture feature values for a portion of the plurality of identified objects; and
   determining the quality of interest value from a regression model evaluated using the texture feature values, wherein the regression model comprises regression parameters based on texture feature values of control objects.

5. The method of claim 1, further comprising:
   classifying at least one of a portion of the 3D image or a sample associated with the 3D image by:
   determining texture feature values for a portion of the set of filtered images; and
   calculating one or more classification scores from the texture feature values and using the classification score(s) to classify at least one of the portion of the 3D image or the sample associated with the 3D image.

6. The method of claim 1, further comprising:
   determining a quality of interest of a sample associated with the 3D image by:
   determining texture feature values for a portion of the filtered images; and
   determining the quality of interest value from a regression model evaluated using the texture feature values, wherein the regression model comprises regression parameters based on texture feature values of control images.

7. The method of claim 1, wherein the applying the set of rotationally invariant 3D texture filters to the set of second-derivative images comprises:
   computing, from the set of second-derivative images, a set of three eigenvalue images;
   computing, from the set of three eigenvalue images, a modulus of a vector of three Hessian eigenvalues for each voxel and, for each predefined characteristic direction of the set of predefined characteristic directions, an angular factor, thereby producing a set of angular factors for each voxel; and
   generating the set of filtered images using the modulus and the set of angular factors for each voxel.

8. The method of claim 1, wherein each filter of the set of rotationally invariant 3D texture filters is associated with a corresponding predefined characteristic direction from the set of predefined characteristic directions.

9. The method of claim 1, wherein the set of predefined characteristic directions comprises one or more members selected from the group consisting of: (i) characteristic direction (0,0,−1) corresponding to a Bright Plane filter, (ii) characteristic direction (0,−1,−1)/sqrt(2) corresponding to a Bright Line filter, (iii) characteristic direction (−1,−1,−1)/sqrt(3) corresponding to a Bright Spot filter, (iv) characteristic direction (1,−1,−1)/sqrt(3) corresponding to a Bright Saddle filter, (v) characteristic direction (1,0,−1)/sqrt(2) corresponding to a Saddle Filter, (vi) characteristic direction (1,1,−1)/sqrt(3) corresponding to a Dark Saddle filter, (vii) characteristic direction (1,1,1)/sqrt(3) corresponding to a Dark Spot filter, (viii) characteristic direction (1,1,0)/sqrt(2) corresponding to a Dark Line filter, and (ix) characteristic direction (1,0,0) corresponding to a Dark Plane filter.

10. The method of claim 7, wherein, the computing the angular factor, for each voxel and for each predefined characteristic direction of the set of predefined characteristic directions, comprises determining an angle between a direction of the vector comprising the three Hessian eigenvalues of the voxel and the predefined characteristic direction.

11. The method of claim 1, wherein the set of second-derivative filters comprises one or more of a finite-impulse-response (FIR) approximation to a Gaussian derivative filter and a recursive infinite-impulse-response (IIR) approximation to a Gaussian derivative filter.

12. The method of claim 7, further comprising:
calculating, for each voxel of each filtered image of the set of filtered images, one or more angles between a direction of an axis associated with the 3D image and a direction of one or more Hessian eigenvectors; and
generating, from at least one of the filtered images of the set of filtered images, a first image and a second image, using the calculated angle(s), wherein the first image includes a horizontal component of the filtered image and the second image includes a vertical component of the filtered image.

13. The method of claim 1, further comprising:
following the receiving the 3D image, applying one or more deconvolution filters, by the processor, to the 3D image to correct for anisotropy in optical resolution.

14. The method of claim 1, further comprising:
following the applying the set of second-derivative filters to the 3D image, scaling second derivatives in each second-derivative image of the set of second-derivative images in one or more directions, using one or more coefficients to correct for anisotropy in image and/or optical resolution.

15. The method of claim 14, wherein the one or more coefficients used to correct for anisotropy are determined empirically by (i) maximizing a ratio of an intensity of a spot-filtered image to an intensity of a line-filtered image and/or (ii) maximizing a signal-to-noise ratio of classification scores associated with objects from two different classes.

16. The method of claim 1, comprising, following receiving the 3D image, binning the 3D image using one or more binning factors, wherein each of the one or more binning factors comprises a coefficient for each dimension of the 3D image.

17. The method of claim 1, wherein the 3D image is a multi-channel image comprising two or more channels of image data.

18. The method of claim 2, further comprising:
determining morphological feature values for a portion of the plurality of objects;
calculating one or more classification scores from the texture feature values and the morphological feature values; and
using the classification score(s) to classify each object of the portion of objects.

19. A method of two-dimensional image analysis, the method comprising:
receiving, by a processor of a computing device, a two-dimensional (2D) image comprising pixels;
applying, by the processor, a set of second-derivative filters to the 2D image, thereby producing a corresponding set of second-derivative images;
applying, by the processor, a set of rotationally invariant 2D texture filters to the set of second-derivative images using a set of predefined characteristic directions, thereby producing a corresponding set of filtered images;
identifying, by the processor, using at least one of the set of filtered images or the 2D image, a plurality of objects in the 2D image; and
performing, by the processor and using the set of filtered images, at least one of:
(a) classifying a portion of the plurality of identified objects in the 2D image;
(b) segmenting the 2D image to separate a portion of the plurality of identified objects from the 2D image; or
(c) determining a quality of interest value for a portion of the plurality of identified objects in the 2D image.

20. A system for three-dimensional image analysis, the system comprising:
a processor of a computing device; and
a memory storing instructions that, when executed by the processor, cause the processor to:
(i) receive a three-dimensional (3D) image comprising voxels;
(ii) apply a set of second-derivative filters to the 3D image, thereby producing a corresponding set of second-derivative images;
(iii) apply a set of rotationally invariant 3D texture filters to the set of second-derivative images using a set of predefined characteristic directions, thereby producing a corresponding set of filtered images;
(iv) identify using at least one of the set of filtered images or the 3D image, a plurality of objects in the 3D image; and
(v) perform, using the set of filtered images, at least one of:
(a) classifying a portion of the plurality of identified objects in the 3D image;
(b) segmenting the 3D image to separate a portion of the plurality of identified objects from the 3D image; and
(c) determining a quality of interest value for a portion of the plurality of identified objects in the 3D image.

21. A system for two-dimensional image analysis, the system comprising:
a processor of a computing device; and
a memory storing instructions that, when executed by the processor, cause the processor to:
(i) receive a two-dimensional (2D) image comprising pixels;
(ii) apply a set of second-derivative filters to the 2D image, thereby producing a corresponding set of second-derivative images;
(iii) apply a set of rotationally invariant 2D texture filters to the set of second-derivative images using a set of predefined characteristic directions, thereby producing a corresponding set of filtered images;

(iv) identify using at least one of the set of filtered images or the 2D image, a plurality of objects in the 2D image; and
(v) perform, using the set of filtered images, at least one of:
  (a) classifying a portion of the plurality of identified objects in the 2D image;
  (b) segmenting the 2D image to separate a portion of the plurality of identified objects from the 2D image; or
  (c) determining a quality of interest value for a portion of the plurality of identified objects in the 2D image.

22. The method of claim 19, wherein applying the set of rotationally invariant 2D texture filters to the set of second-derivative image comprises:
  computing, from the set of second-derivative images, two eigenvalue images;
  computing, from the two eigenvalue images, a modulus for each pixel and, for each predefined characteristic direction of the set of predefined characteristic directions, an angular factor, thereby producing a set of angular factors; and
  generating the set of filtered images using the modulus and the set of angular factors for each pixel.

23. The method of claim 19, wherein the set of predefined characteristic directions comprises one or more members selected from the group consisting of: characteristic direction (1,1)/sqrt(2) corresponding to a Dark Spot filter, (1,0) corresponding to a Dark Line filter, (1,−1)/sqrt(2) corresponding to a Saddle filter, (0,−1) corresponding to a Bright Line filter, and (−1,−1)/sqrt(2) corresponding to a Bright Spot filter.

24. The method of claim 1, wherein the performing comprises performing, by the processor, (a), wherein classifying the portion of the plurality of identified objects in the 3D image is performed using a method of statistical analysis, pattern recognition, or machine learning.

25. The method of claim 1, further comprising segmenting a portion of the plurality of identified objects to identify discrete portions of the objects.

26. The method of claim 1, further comprising determining, using the set of filtered images, texture feature values for a portion of the plurality of identified objects, wherein each of the texture feature values comprises a numerical value associated with a corresponding object.

27. The method of claim 1, further comprising determining texture feature values for a portion of the set of filtered images, wherein each of the texture feature values comprises a numerical value corresponding to an average intensity of a portion of a corresponding filtered image.

* * * * *